(12) United States Patent
Craft et al.

(10) Patent No.: US 11,378,036 B2
(45) Date of Patent: Jul. 5, 2022

(54) BORE BRIDGE COOLING CHANNELS

(71) Applicant: Ford Global Technologies, LLC, Dearborn, MI (US)

(72) Inventors: Justin Craft, Royal Oak, MI (US); Phil Cierpial, Grosse Pointe Park, MI (US); Mathew Hintzen, Stockbridge, MI (US); Antony Schepak, Howell, MI (US); Daryl Self, Trenton, MI (US); Baran Celikten, Dearborn, MI (US); Paul Shoemaker, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/060,399

(22) Filed: Oct. 1, 2020

(65) Prior Publication Data

US 2022/0106924 A1   Apr. 7, 2022

(51) Int. Cl.
| | | |
|---|---|---|
| *F02F 1/14* | (2006.01) |
| *F02F 1/16* | (2006.01) |
| *F01P 3/02* | (2006.01) |
| *F01P 7/14* | (2006.01) |
| *F02F 11/00* | (2006.01) |
| *F02F 7/00* | (2006.01) |
| *F16J 15/08* | (2006.01) |

(52) U.S. Cl.
CPC ............. *F02F 1/16* (2013.01); *F01P 7/14* (2013.01); *F02F 7/0007* (2013.01); *F02F 11/002* (2013.01); *F02F 11/005* (2013.01); *F16J 15/0818* (2013.01); *F01P 2007/143* (2013.01)

(58) Field of Classification Search
CPC .......... F01P 3/02; F01P 2003/021; F02F 1/14; F02F 1/10; F02F 1/16; F02F 2001/104; F02F 1/02
See application file for complete search history.

(56) References Cited

U.S. PATENT DOCUMENTS

| | | | | |
|---|---|---|---|---|
| 4,693,294 A | * | 9/1987 | Albrecht | ............... F02F 1/108 123/41.74 |
| 5,474,040 A | * | 12/1995 | Murakami | ............ F02F 7/0007 123/193.2 |
| 9,068,496 B2 | | 6/2015 | Beyer et al. | |
| 9,284,875 B2 | | 3/2016 | Williams et al. | |
| 9,470,176 B2 | | 10/2016 | Beyer et al. | |
| 9,488,127 B2 | | 11/2016 | Beyer et al. | |
| 9,528,464 B2 | | 12/2016 | Beyer et al. | |
| 9,670,822 B2 | | 6/2017 | Beyer et al. | |

(Continued)

*Primary Examiner* — Long T Tran
(74) *Attorney, Agent, or Firm* — Vincent Mastrogiacomo; McCoy Russell LLP

(57) ABSTRACT

Systems are provided for cooling a cylinder block via bore bridge cooling passages. In one example, a cylinder block with a bore bridge positioned between a first cylinder and a second cylinder, the cylinder block also including a coolant jacket at least partially surrounding the first cylinder and the second cylinder, has at least one cooling passage positioned within the bore bridge. An inlet of the at least one cooling passage has a larger area than an outlet of the at least one cooling passage and at least a portion of the at least one cooling passage has a non-cylindrical geometry formed by a lost core.

19 Claims, 10 Drawing Sheets

(4 of 10 Drawing Sheet(s) Filed in Color)

(56) References Cited

U.S. PATENT DOCUMENTS

| | | | |
|---|---|---|---|
| 2002/0100435 A1* | 8/2002 | Osman | F02F 1/14 |
| | | | 123/41.72 |
| 2013/0333658 A1* | 12/2013 | Yamamoto | F02F 1/14 |
| | | | 29/888.01 |
| 2014/0331947 A1 | 11/2014 | Beyer et al. | |
| 2015/0361862 A1 | 12/2015 | Williams et al. | |
| 2016/0040621 A1 | 2/2016 | Beyer et al. | |
| 2016/0069248 A1* | 3/2016 | Beyer | F01P 3/02 |
| | | | 123/41.74 |
| 2016/0273478 A1* | 9/2016 | Mandorfer | B22C 9/10 |
| 2016/0281583 A1* | 9/2016 | Michikawauchi | F01P 3/02 |
| 2017/0152809 A1* | 6/2017 | Wicks | F02F 1/14 |
| 2018/0179984 A1* | 6/2018 | Oso | F02F 1/14 |
| 2018/0306095 A1* | 10/2018 | Steiner | F01P 7/165 |
| 2019/0112963 A1* | 4/2019 | Tabata | F01P 3/02 |

\* cited by examiner

BORE BRIDGE COOLING CHANNELS

FIELD

The present description relates generally to a cylinder block and cooling passages within the cylinder block.

BACKGROUND/SUMMARY

Engine systems often comprise a cylinder block with an attached cylinder head that include a series of cylinders with surrounding material for attaching various components. Cylinder blocks and cylinder heads also include cooling systems that comprise a number of cooling passages that surround the cylinders. A coolant, such as water, oil, glycol, etc., may be pumped or otherwise sent through the cooling passages to remove heat from the cylinder block and the cylinder head via heat exchange. However, it may be challenging to cool the bore bridges on the cylinder block and/or the cylinder head, which are the regions between adjacent cylinders. The bore bridges are stressed areas with little packaging space and that are exposed to high amounts of heat. If the bore bridges are not adequately cooled, cylinder bore distortion, liner degradation, and other issues may occur, compromising engine stability.

Other attempts to address cooling of cylinder block bore bridges include drilling or coring one or more cooling passages in each bore bridge. One example approach is shown by Williams et al. in U.S. Pat. No. 9,284,875. Therein, a cylinder block includes bore bridges between adjacent cylinders, with cross-drilled passages located in the bore bridges. Water coolant is provided from a cylinder head to the cross-drilled passages, while the remainder of the cylinder block is cooled with a separate, oil coolant system.

However, the inventors herein have recognized potential issues with such systems. As one example, the inclusion of a single passage having one inlet and one outlet in a bore bridge may not provide adequate cooling for all engine types and modes of operation. Further, while the positioning of the cross-drilled passage in the bore bridge of Williams may adequately cool the deck face at the bore bridge, the inventors herein have recognized that additional hot spots may be present within the bore bridge, below the deck face, and that a cooling passage positioned to cool the deck face may not adequately cool these additional hot spots. Further still, the use of two separate cooling systems (water versus oil) may be complex, costly, and not appropriate for all engine types.

In one example, the issues described above may be addressed by a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder, and at least one cooling passage positioned within the bore bridge, the at least one cooling passage including an inlet fluidly coupled to the coolant jacket and having a larger area than an outlet positioned at a deck face of the cylinder block, wherein at least a portion of the at least one cooling passage has a non-cylindrical geometry formed by a lost core. As a result, the bore bridge may be cooled by a cooling passage with a geometry optimized to increase cooling efficiency.

As one example, forming the cooling passage by the lost core allows the cooling passage to have a non-circular cross-section, thereby increasing a surface area for heat exchange. Use of lost core molding allows a single cooling passage to extend further down into a depth of the bore bridge to extract heat from a target region along a mid-region of the bore bridge prone to forming a hot spot. In this way, the bore bridge may be sufficiently cooled and cylinder bore distortion may be reduced or avoided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2, 3, 7-10, and 13 are shown approximately to scale.

DETAILED DESCRIPTION

Figure 1:
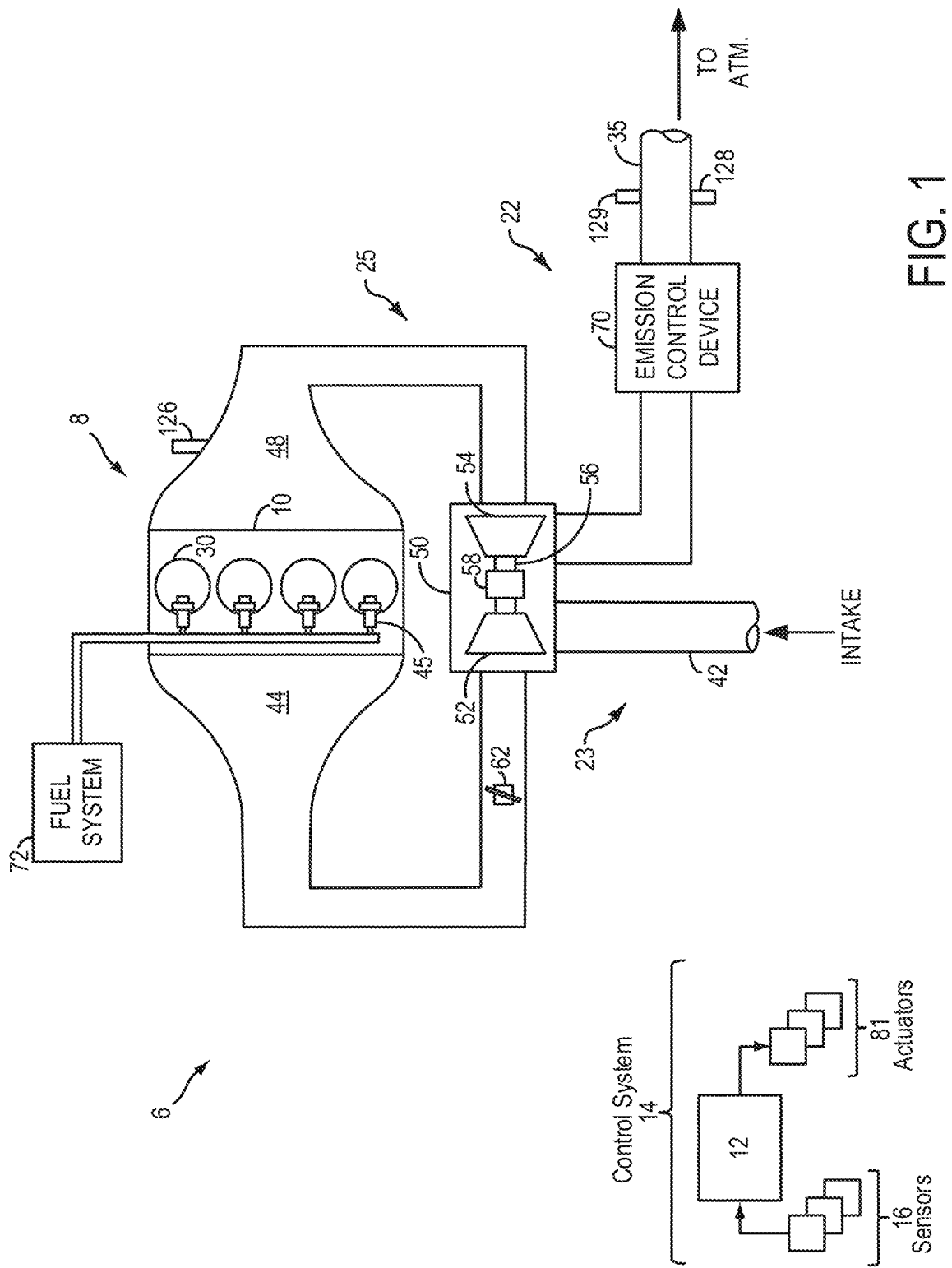
FIG. 1 shows a simplified schematic diagram of a vehicle system.

FIG. 1 shows a schematic depiction of a vehicle system 6. The vehicle system 6 includes an engine system 8 coupled to an exhaust after-treatment system 22. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger.

Turbocharger 50 may include a compressor 52, arranged between intake passage 42 and intake manifold 44. Compressor 52 may be at least partially powered by exhaust turbine 54, arranged between exhaust manifold 48 and exhaust passage 35. Compressor 52 may be coupled to exhaust turbine 54 via shaft 56. Compressor 52 may also be at least partially powered by an electric motor 58, in some examples. In the depicted example, electric motor 58 is shown coupled to shaft 56. However, other suitable configurations of the electric motor may also be possible. In one example, the electric motor 58 may be operated with stored electrical energy from a system battery (not shown) when the battery state of charge is above a charge threshold. By using electric motor 58 to operate turbocharger 50, for example at engine start, an electric boost (e-boost) may be provided to the intake air charge. However, in other examples, the compressor 52 may be fully powered by the exhaust turbine 54. Further, in some examples, the turbocharger 50 may be dispensed with and engine 10 may be naturally-aspirated.

Engine exhaust 25 may be coupled to exhaust aftertreatment system 22 along exhaust passage 35. Exhaust after-treatment system 22 may include one or more emission control devices 70, which may be mounted in a close-coupled position in the exhaust passage 35. One or more emission control devices may include a three-way catalyst, lean NOx filter, SCR catalyst, etc. Exhaust after-treatment system 22 may also include hydrocarbon retaining devices, particulate matter retaining devices, and other suitable exhaust after-treatment devices (not shown). It will be appreciated that other components may be included in the engine such as a variety of valves and sensors.

The vehicle system 6 may further include a control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injectors 45 (described later), a variety of valves, electric motor 58, and throttle 62. The control system 14 may include a controller 12. The controller may receive input data from the various sensors, process the input data, and trigger the actuators in response to the processed input data, based on instruction or code programmed therein, corresponding to one or more routines. In particular, controller 12 may be a microcomputer, including microprocessor unit, input/output ports, an electronic storage medium for executable programs and calibration values such as a read only memory chip, random access memory, keep alive memory, and a data bus. The storage medium read-only memory can be programmed with computer readable data representing instructions executable by the processor for performing the control methods for different components of FIG. 1.

In some embodiments, each cylinder of engine 10 may be configured with one or more fuel injectors for providing fuel thereto. As a non-limiting example, cylinders 30 are shown including fuel injectors 45 coupled directly to cylinders 30. Fuel injectors 45 may inject fuel directly therein in proportion to a pulse width of a signal received from controller 12 via an electronic driver. In this manner, fuel injectors 45 provide what is known as direct injection (hereafter referred to as "DI") of fuel into combustion cylinder 30. While FIG. 1 shows injectors 45 as side injectors, they may also be located overhead of the cylinders or in other locations in the cylinders 30. Alternatively, the injectors 45 may be located overhead and near intake valves (not shown). Fuel may be delivered to fuel injectors 45 from high pressure fuel system 72 including various components such as a fuel tank, fuel pumps, and a fuel rail. Alternatively, fuel may be delivered by a single stage fuel pump at lower pressure. Further, while not shown, the fuel tank may have a pressure transducer providing a signal to controller 12.

It will be appreciated that in an alternate embodiment, injectors 45 may be port injectors providing fuel into a series of intake ports upstream of cylinders 30 in intake 23. It will also be appreciated that cylinders 30 may receive fuel from a plurality of injectors, such as a plurality of port injectors, a plurality of direct injectors, or a combination thereof.

Engine 10, containing cylinders 30 and other components, may be formed from several large pieces. For example, a top portion of the engine 10 containing camshafts, intake/exhaust ports, and fuel injection components may be contained in a cylinder head that is attached to a separate engine block. The engine block may contain the geometry that defines the shape of cylinders 30 as well as various passages for the cooling system for removing heat from cylinders 30 during engine operation.

In some examples, vehicle system 6 may be a hybrid vehicle with multiple sources of torque available to one or more vehicle wheels 95. In other examples, vehicle system 6 is a conventional vehicle with only an engine, or an electric vehicle with only electric machine(s). In the example shown, vehicle system 6 includes engine 10 and an electric machine 92. Electric machine 92 may be a motor or a motor/generator. Engine 10 may include a crankshaft (not shown) and the crankshaft and electric machine 92 may be connected via a transmission 94 to vehicle wheels 95 when one or more clutches 96 are engaged. In the depicted example, a first clutch 96 is provided between the crankshaft and electric machine 92, and a second clutch 96 is provided between electric machine 92 and transmission 94. Controller 12 may send a signal to an actuator of each clutch 96 to engage or disengage the clutch, so as to connect or disconnect the crankshaft from electric machine 92 and the components connected thereto, and/or connect or disconnect electric machine 92 from transmission 94 and the components connected thereto. Transmission 94 may be a gearbox, a planetary gear system, or another type of transmission. The powertrain may be configured in various manners including as a parallel, a series, or a series-parallel hybrid vehicle.

Electric machine 92 receives electrical power from a traction battery 98 to provide torque to vehicle wheels 95. Electric machine 92 may also be operated as a generator to provide electrical power to charge battery 98, for example during a braking operation.

With modern vehicles, there is a constant demand for improving fuel economy while lowering emissions, which may be achieved by modifying various systems of the vehicle. One way to improve fuel economy and lower emissions is to quickly increase the temperature of the engine after the vehicle is turned on after a period of being off. In other words, by decreasing the time to warm-up the engine, fuel economy may be improved and emissions may be lowered. Fast engine warm-up may help reduce friction and emissions that are commonly higher at engine start-up compared to a fully-warm engine. In this context, engine warm-up may include increasing the temperature of the engine and associated components, including but not limited to, the cylinder block, cylinder head, pistons, cylinders, and intake/exhaust valves. Once the engine is warmed-up, the engine may be maintained at a desired temperature that prevents or reduces degradation based on high temperature load while providing for target combustion efficiency, emissions compliance, and operator-requested torque.

Thus, vehicle systems, such as vehicle system 6 of FIG. 1, may include various coolant jackets/passages throughout the cylinder block and the cylinder head to promote fast engine warm-up as well as ensure engine temperature does not increase above a desired temperature during operation. For example, the cylinder block may include a coolant jacket that partially surrounds each cylinder, which may act to transfer heat from the cylinders to the coolant flowing in the coolant jacket. However, due to the structural demands of the engine, the coolant jacket typically does not extend in the areas between adjacent cylinders, and thus high local temperatures may occur in the areas in between adjacent cylinders. The higher local temperatures may be high enough to adversely affect engine performance and/or increase the likelihood of degradation to the cylinder block, cylinder head, and other components. The areas in between adjacent cylinders are also known as bore bridges, or the top of the bores (cylinders) where common walls are shared between cylinders.

Figure 2:
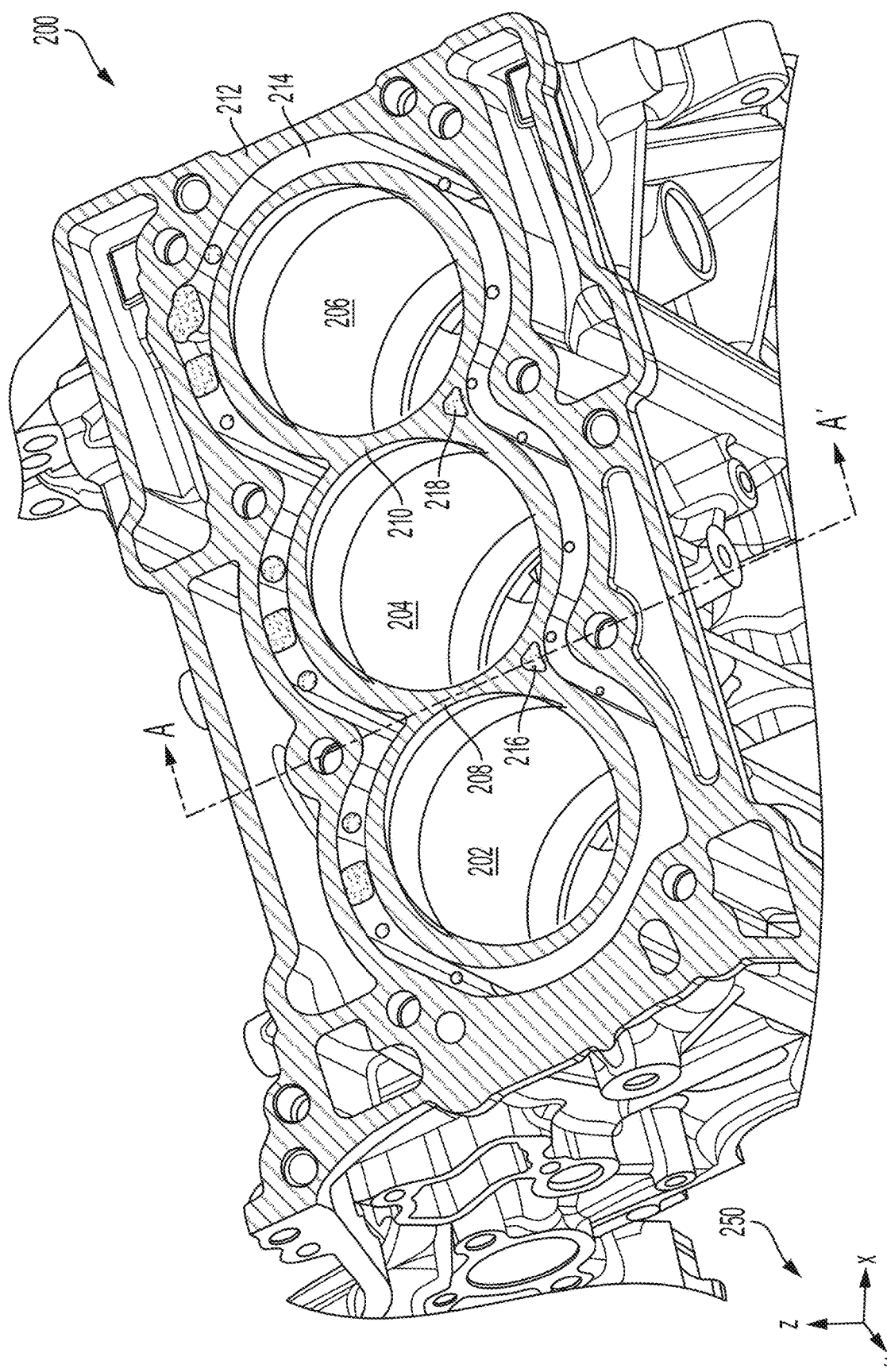
FIG. 2 shows a top perspective view of a cylinder block including a head gasket.

FIG. 2 shows a perspective view of a cylinder block 200. A first cylinder 202 is shown adjacent to a second cylinder 204, separated by a first bore bridge 208. A third cylinder 206 is shown adjacent to the second cylinder 204, separated by a second bore bridge 210. A gasket 212 is positioned on a top surface (or deck face) of the cylinder block 200 that defines a generally planar surface extending in a zy plane as defined by the Cartesian coordinate system 250 shown in FIG. 2, where the y-axis of the coordinate system 250 is parallel to gravity and perpendicular to flat ground. In one example, the y-axis is parallel with a cylinder axis of cylinder block 200. The top surface, via the gasket 212, may contact a bottom surface of a cylinder head when the cylinder block 200 and cylinder head are attached. The cylinder head is not shown in FIG. 2.

The cylinder block 200 includes a coolant jacket 214 that partially surrounds the cylinders. The coolant jacket 214 is configured to flow coolant (e.g., when cylinder block 200 is installed in a vehicle and is supplied with coolant via a vehicle coolant system) around the cylinders to transfer heat to and/or from the cylinders. Coolant in the coolant jacket 214 may flow through the coolant jacket 214 and then out to various engine system components, such as a cylinder heat coolant jacket, cylinder head cooling passages, a turbocharger, a radiator, etc. As shown in FIG. 2, the coolant jacket 214 surrounds a majority of the perimeter of each cylinder but does not fully surround each cylinder, as the cylinders are separated by the bore bridges described above and the coolant jacket 214 does not extend across the bore bridges.

Thus, as will be described in more detail below, cooling passages may be cast and/or drilled into the bore bridges, with each cooling passage having an inlet fluidly coupled to the coolant jacket 214. Coolant may then flow through the cooling passages to cool the bore bridges. The cooling passages may have outlets positioned on the deck face of the cylinder block 200, such that coolant may exit the cooling passages and travel to the cylinder head.

Accordingly, the gasket 212 may include two openings, each aligned with a bore bridge cooling passage outlet. For example, the gasket 212 includes a first opening 216 and a second opening 218. The first opening 216 may be aligned with an outlet of a first set of cooling passages positioned in the bore bridge 208 and the second opening 218 may be aligned with an outlet of a second set of cooling passages positioned in the bore bridge 210.

While FIG. 2 shows a cylinder block with 3 inline cylinders, the cylinder block 200 may have more or fewer cylinders without departing from the scope of this disclosure, such as four cylinders. The cylinder block 200 may be installed in a vehicle with a cylinder head to form an engine, such as engine 10 of FIG. 1.

Figure 3:
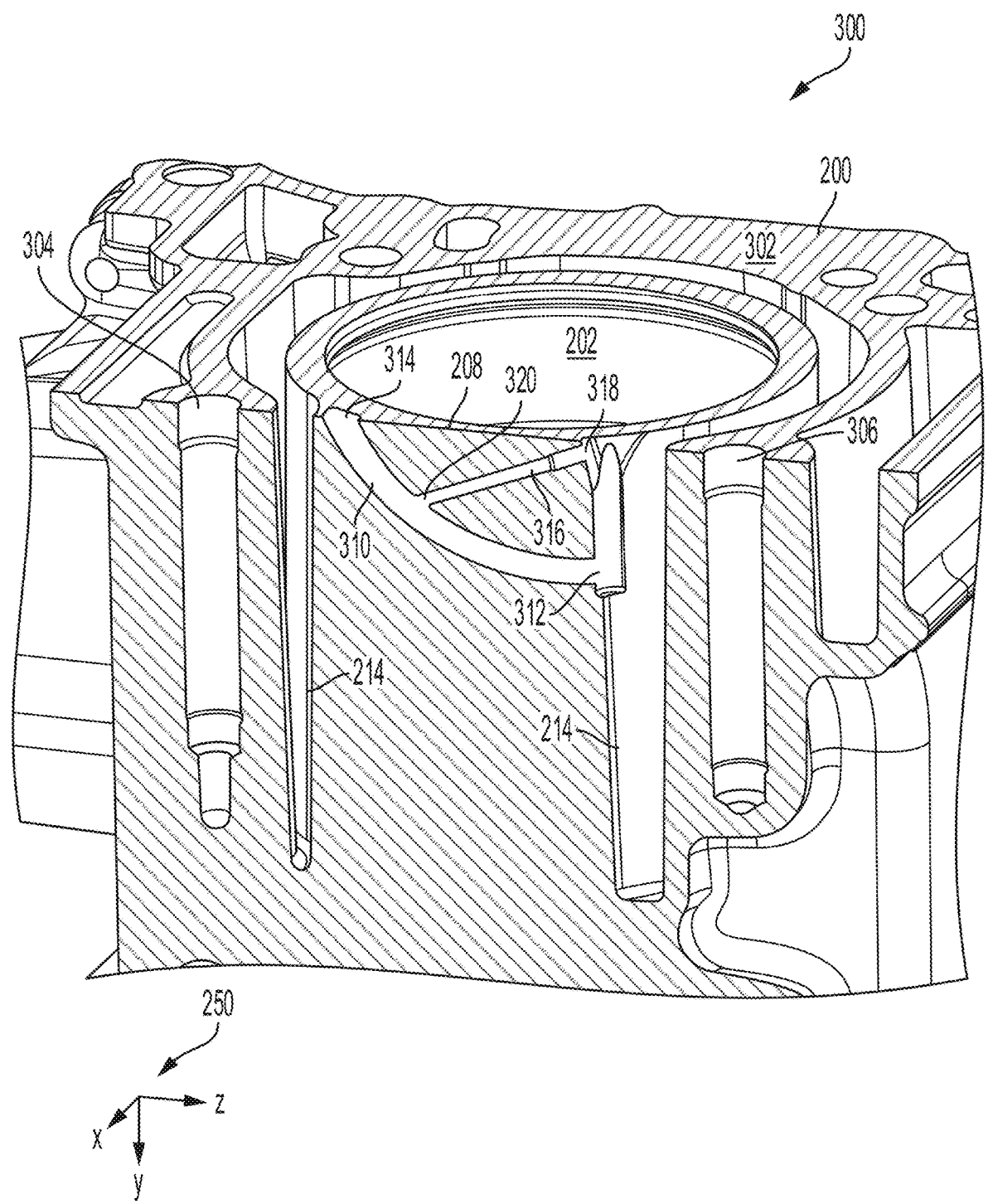
FIG. 3 shows a cross-sectional view of a bore bridge of the cylinder block of FIG. 2.

FIG. 3 shows a cross-sectional view 300 of the cylinder block 200, taken across line A-A' of FIG. 2. In FIG. 3, the gasket 212 has been removed for clarity, and as such a deck face 302 of the cylinder block 200 is visible. As shown in FIG. 3, the cylinder block 200 includes various passages/cavities, such as the coolant jacket 214, a first bore 304, and a second bore 306. The first bore 304 and the second bore 306 may each be configured to accommodate a respective fastener in order to secure the cylinder head to the cylinder block 200.

As appreciated by FIG. 3, the coolant jacket 214 extends around a majority of the cylinder 202 (e.g., 75%) but does not extend across the bore bridge 208. To cool the bore bridge 208, a set of cooling passages is present in the bore bridge 208. The set of cooling passages includes a first cooling passage 310. The first cooling passage 310 includes a first inlet 312 that is fluidly coupled to the coolant jacket 214 and a first outlet 314 at the deck face 302. The first cooling passage 310 curves from the first inlet 312 to the first outlet 314 with a curvature that is greater than zero, as will be described in more detail below. Further, in some examples, the first cooling passage 310 may have a cross-sectional area at the first inlet 312 that is smaller than a cross-sectional area of the first cooling passage 310 at the first outlet 314. The second cooling passage 316 may therefore fluidly couple to the first cooling passage 310 via the second outlet 320 at a secondary inlet of the first cooling passage 310. The secondary inlet of the first cooling passage 310 may be positioned closer to the first outlet 314 than the first inlet 312, at least in some examples. In other examples, the secondary inlet may be positioned at an exact midpoint of the first cooling passage, or closer to the first inlet than the first outlet.

The set of cooling passages includes a second cooling passage 316 having a second inlet 318 and a second outlet 320. The second inlet 318 of the second cooling passage 316 is fluidly coupled to the coolant jacket 214 and the second outlet 320 is fluidly coupled to the first cooling passage 310. Thus, the second cooling passage 316 may terminate at the first cooling passage 310, and coolant that flows through the second cooling passage 316 may mix with coolant flowing in the first cooling passage 310 to exit at the first outlet 314.

The second cooling passage 316 may extend in a straight line from the second inlet 318 to the second outlet 320, and thus may not include any bends or curves. The second cooling passage 316 may extend downward, such that second inlet 318 of the second cooling passage 316 may be positioned vertically above the second outlet 320 and also vertically above the first inlet 312 of the first cooling passage 316. As used herein, the second inlet 318 being positioned vertically above the second outlet 320 and the second inlet 318 being positioned vertically above the first inlet 312 may include the first inlet 312 and the second outlet 320 each being positioned closer than the second inlet 318 to a ground on which a vehicle (in which cylinder block 200 is positioned) sits along the y axis of coordinate system 250, with the second inlet 318 being positioned closer to the deck face 302 than the first inlet 312 and the second outlet 320, along the y axis. In some examples, the second outlet 320 may be positioned vertically above the first inlet 312.

The set of cooling passages described above may provide several advantages over prior straight and/or single bore bridge cooling passages. As will be described in more detail below with respect to FIG. 5, the dual passages may provide increased cooling of the bore bridge, lowering temperatures at the deck face as well as at greater depths of the bore bridge, which may reduce cylinder bore/liner distortion and thus may allow the engine to operate at higher power and/or extend the life of the engine. In particular, the first cooling passage 310 may provide cooling to a secondary hot spot positioned vertically below the deck face, while the second cooling passage 316 may ensure the deck face (which may include a primary hot spot) is still adequately cooled. Further, the cooling passage configuration shown in FIG. 3, where the second cooling passage 316 terminates at the first cooling passage 310 and all coolant flowing through the set of cooling passages exits the cylinder block 200 at the first outlet 314, reduces manufacturing complexity by eliminating a secondary outlet that would necessitate an additional hole in the gasket 214 and also necessitate an additional corresponding inlet on the cylinder head.

Further, the curvature of the first cooling passage 310 in combination with the increasing cross-sectional area of the first cooling passage 310 (e.g., from the first inlet 312 to the first outlet 314) may enhance coolant flow through both the first cooling passage 310 and the second cooling passage 316, thereby increasing the heat transfer ability of the set of cooling passages. Additionally, by angling the second cooling passage 316 downward while the first cooling passage 310 is curved upward, the first inlet 312 and the second inlet 318 may be spaced apart, which may ensure sufficient structural integrity of the bore bridge.

As will be explained in more detail below, the second cooling passage 316 may be a drilled passage, where the second cooling passage 316 is formed by drilling after cylinder block 200 is cast. However, because the first cooling passage 310 is curved, the first cooling passage 310 cannot easily be formed by drilling or other post-casting processes. Thus, the first cooling passage 310 may be formed during casting of cylinder block 200 via inclusion of a curved component, referred to as a curved bore pin, on a tool used to cast the cylinder block.

Figure 4:
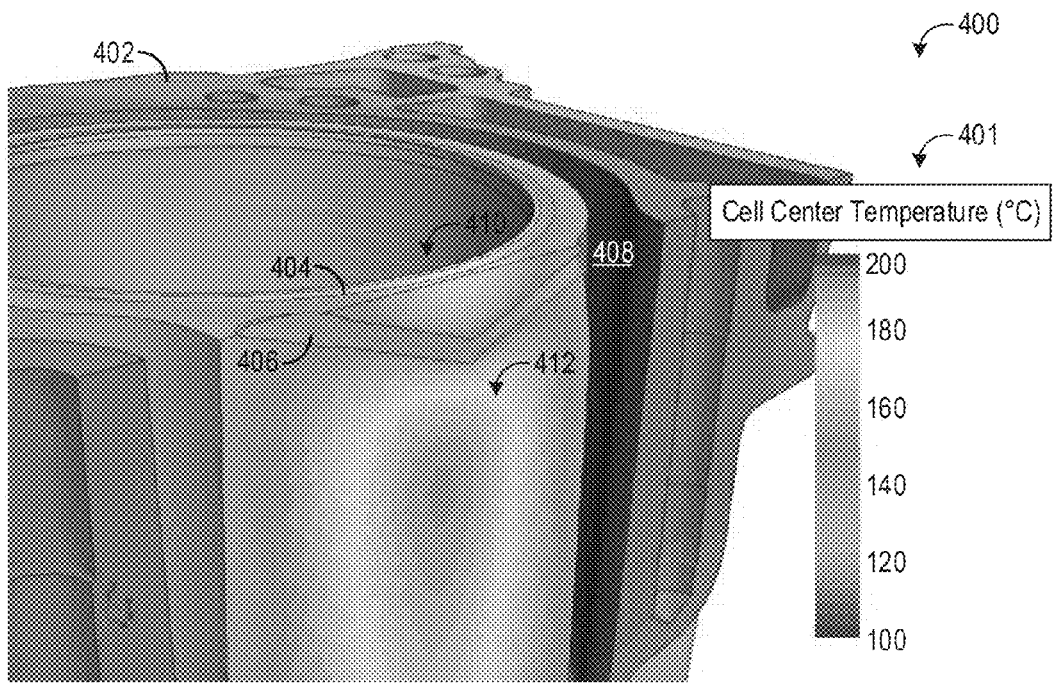
FIGS. 4 and 5 show cross-sectional views of bore bridges of a conventional cylinder block and the cylinder block of FIG. 2, respectively, with respective temperature gradients.
Figure 5:
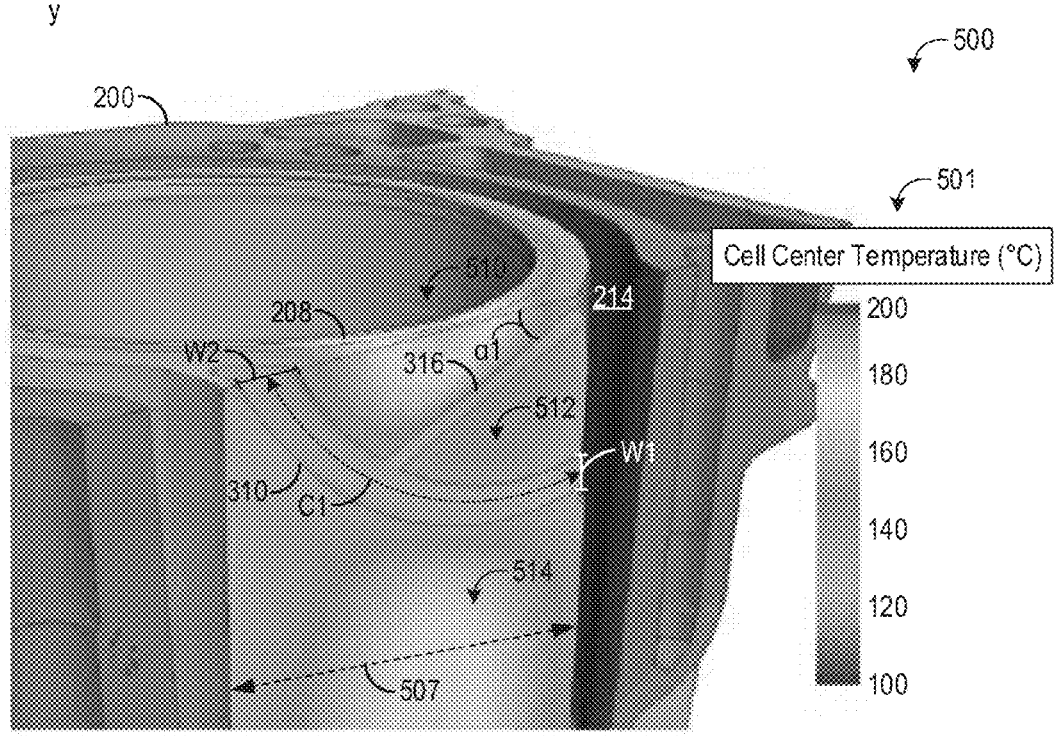

FIG. 4 shows a cross-sectional view 400 of a cylinder block including a conventional bore bridge cooling passage and FIG. 5 shows a cross-sectional view 500 of the cylinder block 200 including the curved cooling passage and the additional, straight cooling passage. FIGS. 4 and 5 each illustrate temperatures exhibited by the cylinder blocks during high load operation where engine temperatures may reach maximum temperatures, with coolant flowing through the coolant jackets and cooling passages. FIGS. 4 and 5 each include a temperature legend (temperature legend 401 in FIG. 4 and temperature legend 501 in FIG. 5) and the colors shown in each of FIGS. 4 and 5 corresponds to a temperature as indicated by the respective temperature legend.

Referring first to FIG. 4, it shows a cross-sectional view 400 of a conventional cylinder block 402 including a conventional bore bridge cooling passage 406 positioned in a bore bridge 404 between adjacent cylinders of the cylinder block 402. The cooling passage 406 is fluidly coupled to a coolant jacket 408 on an inlet side of the cooling passage 406 and includes an outlet at a deck face of the cylinder block 402. The cooling passage 406 is the only cooling passage positioned within the bore bridge 404, and includes a single inlet and a single outlet. The cooling passage 406 may be an example of a cross-drilled passage with two portions that intersect at an apex, where the two portions include a first portion that angles downward (e.g., toward the positive y direction) from the inlet to the apex and a second portion that angles upward (e.g., toward the deck face) from the apex to the outlet. Such a configuration may target coolant near the deck face, where temperatures are relatively high, while maintaining structural stability of the bore bridge 404.

Thus, as shown in FIG. 4, the temperature at a first region 410 of the bore bridge may be maintained relatively low (e.g., around 170° C. or lower) via the cooling passage 406, as indicated by the colors of the cylinder block 402 relative to the temperature legend 401. However, the inventors herein have recognized that a second region 412 of the bore bridge 404 may also be prone to high temperatures, and that the cooling passage 406 may not adequately cool this second region 412, thereby forming a secondary, uncooled hot spot. As shown, temperatures in the second region 412 may reach upwards of 190° C. or more, which may lead to cylinder bore distortion and excess piston friction, thereby compromising fuel economy and engine power.

FIG. 5 shows another cross-sectional view 500 of cylinder block 200. As appreciated by FIG. 5, the curved nature of the first cooling passage 310, along with the additional, second cooling passage 316, may target coolant to both a first region 510 (equivalent to the first region 410) and a second region 512 (equivalent to the second region 412). As such, the temperature of the first region 510 may be maintained below about 180° C., while the temperature of the second region 512 may be maintained below 160° C. or so, thereby maintaining the temperature of both hot spots below a threshold temperature of about 180° C. (where temperatures above 180° C., such as 190° or 200° C., may result in cylinder bore distortion). Further, temperatures at a third region 514, below the first cooling passage 310, may be maintained at or below about 170° C.

The additional cooling effect of the first cooling passage 310 may be due at least in part to the curved nature of the first cooling passage 310, the increase in cross-sectional area along the first cooling passage 310, and a relatively wide outlet of the first cooling passage 310. FIG. 5 shows that the first cooling passage 310 may curve from the inlet to the outlet at a curvature C1. The curvature C1 may be a consistent curvature that is maintained across the entirety of the first cooling passage 310, or the curvature C1 may change at one or more points along the first cooling passage 310. The curvature C1 may be selected based on a desired flow rate and/or pressure of coolant through the first cooling passage 310, specific engine cooling demands (e.g., a location of one or more hot spots to be cooled by the first cooling passage 310), and specific engine stability demands (e.g., the thickness of the bore bridge, piston size). In this way, the curvature C1 may be based on the cooling demands of the engine while also balancing structural integrity of the cylinder block (e.g., ensuring that sufficient cylinder block material is maintained in the bore bridge).

The first cooling passage 310 may have a first width W1 at the inlet of the first cooling passage 310 (e.g., at the first inlet 312). The first width W1 may span from a first outer edge of the first cooling passage 310 to a second outer edge of the first cooling passage 310 at the inlet. The first width W1 may extend along an axis substantially parallel to the y axis of the coordinate system 250. The first cooling passage 310 may have a second width W2 at the outlet of the first cooling passage 310 (e.g., at the first outlet 314). The second width W2 may span from the first outer edge of the first cooling passage 310 to the second outer edge of the first cooling passage 310 at the outlet. Due to the curved nature of the first cooling passage 310, the second width W2 may extend along an axis substantially parallel to the z axis of the coordinate system 250. In this way, the coolant flow may enter the first cooling passage 310 along a direction parallel to the z axis and may exit the first cooling passage 310 along a direction parallel to the y axis.

The first width W1 may be smaller than the second width W2, resulting in a cross-sectional area of the first cooling passage 310 at the inlet being smaller than a cross-sectional area of the first cooling passage 310 at the outlet. In some examples, the width of the first cooling passage 310 (and hence the cross-sectional area) may increase consistently/equally (e.g., linearly) along the first cooling passage 310 from the inlet to the outlet. In other examples, the width of the first cooling passage 310 may increase more along some portions of the first cooling passage 310 than other portions.

The first cooling passage 310 may extend (e.g., with a horizontal component) across most of a length 507 of the first bore bridge 208. The length 507 may be the length of the bore bridge 208 at the deck face 302 (though the arrow denoting the length 507 is moved downward for clarity and to allow other components at the deck face to be visualized) and may be defined along the z-axis. The first cooling passage 310 may extend across at least 50% and up to 99% of the length 507 of the first bore bridge 208. For example, the outer edge of the first cooling passage 310 at the first outlet 314 may be spaced from a terminating edge of the bore bridge 208 by an amount (e.g., 1-5 mm) that is 1-49% of the length 507. In some examples, the separation width may be 1-10% of the length 507, such that the first outlet is positioned as close as possible to the edge of the bore bridge, without being in fluid contact with the coolant jacket 214 at the outlet side of the first cooling passage 310.

Additionally, as will be explained in more detail below, the first cooling passage 310 may be formed during casting of the cylinder block. As such, the component used to cast the first cooling passage 310 (e.g., a curved bore pin) is removed after casting. Because of the curved nature of the first cooling passage 310, the curved bore pin cannot be simply pulled upward/outward from the deck face. Rather, the curved bore pin may be rotated out of the cylinder block around an axis of rotation, and the curvature C1 and change in width of the bore pin may also be selected (at least in some examples) to allow the curved bore pin to be removed without undue locking or other issues.

The second cooling passage 316 may extend from its inlet (e.g., the second inlet 318) to its outlet (e.g., the second outlet 320) with the same width/cross-sectional area. In some examples, the width of the second cooling passage 316 may be smaller than the first width W1. The width of the second cooling passage 316 may be based on the width of the bore bridge 208. Further, the second cooling passage 316 may extend downward at an angle relative to the deck face of the cylinder block. For example, the deck face may extend along a horizontal plane (e.g., an xz plane) and the second cooling passage 316 may extend at an angle $\alpha 1$ with respect to the horizontal plane of the deck face. The angle $\alpha 1$ may be selected based on the cooling demands of the cylinder block (e.g., the location of the first and/or second hot spots described above), the change in width of the first cooling passage 310, and other considerations. In some examples, the angle $\alpha 1$ may be in a range of 20-30° or another suitable angle.

While FIGS. 3 and 5 illustrate a single bore bridge having the described first and second cooling passages, it is to be appreciated that each bore bridge of the cylinder block 200 (e.g., bore bridge 208 and bore bridge 210) may have identical or similar bore bridge cooling passages.

Figure 6:
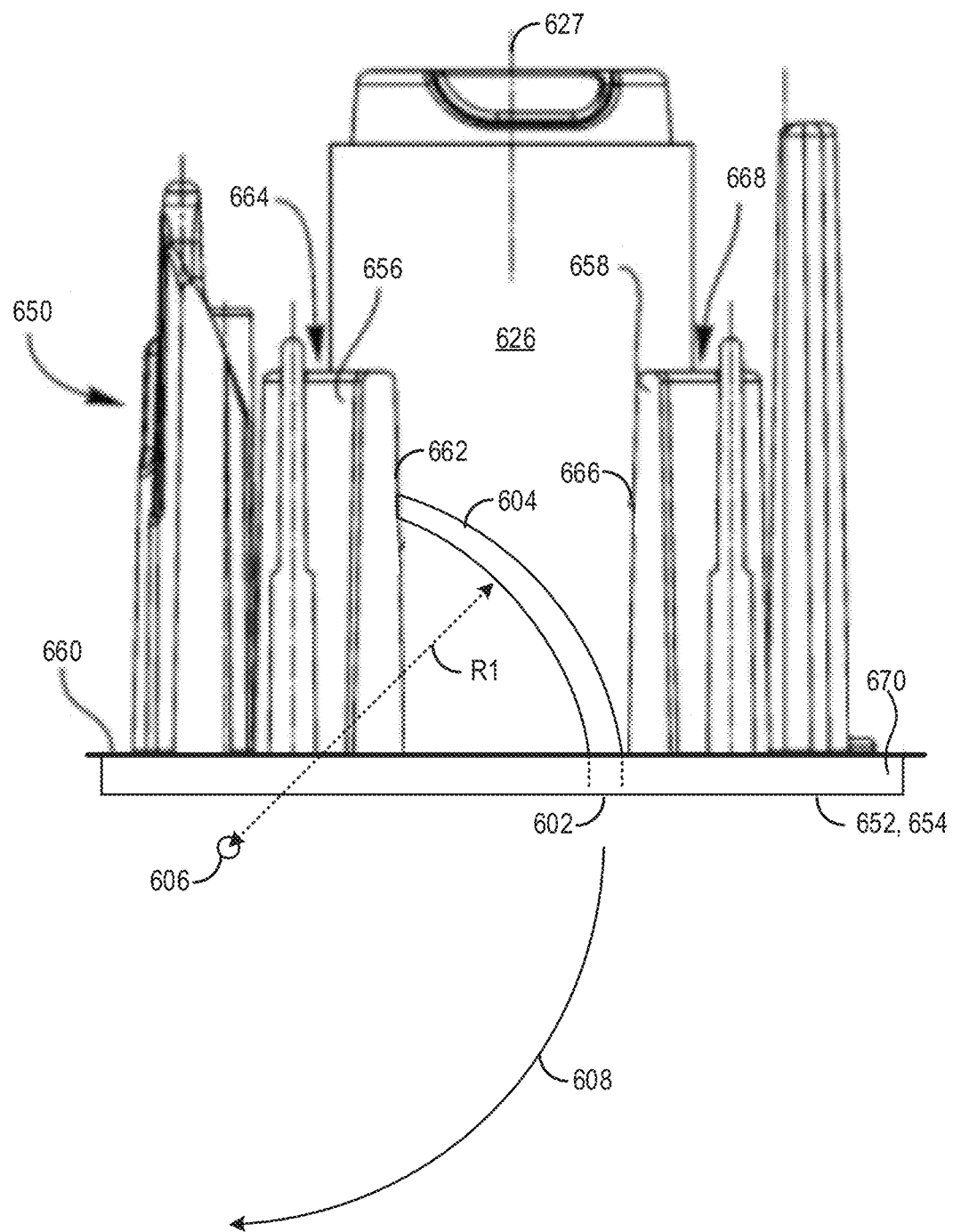
FIG. 6 schematically shows an example die including a curved bore pin, where the die and curved bore pin may be used to cast aspects of the cylinder block of FIG. 2.

FIG. 6 illustrates an example of a tool having a curved bore pin for use with a die to provide a bore bridge cooling passage according to an embodiment of the disclosure. A tool 650 is illustrated for use with a mold for a die casting process in FIG. 6. The tool 650 includes a die 652. In one example, the die 652 may be a slide that cooperates with additional slides when die casting an engine component such as an engine block. The die 652 may form a portion of the engine block, for example, the region surrounding one cylinder, and may cooperate with adjacent, similar dies to form adjacent cylinders. The die 652 may be formed from tool steel or another suitable material for repetitive use in die casting to provide the engine component.

The die 652 has a support member 654 providing a base for various cores and for forming mold cavities. The support member 654 supports a first mold core 656 and a second mold core 658 extending outwardly from a surface 660. The first and second mold cores 656, 658 may be adapted to form a portion of a cylinder cooling jacket. In the example shown, cores 656, 658 are curved protrusions with each sized to form a region of the cooling jacket (such as the coolant jacket 214) surrounding a cylinder. The support member 654 has a cylinder recess sized to receive a cylinder liner 626. The cylinder liner 626 may be made from a ferrous alloy or another material selected for use with the piston for reduced wear. The die casting process for the engine block may include casting the aluminum block directly about the liner 626, as shown.

Core 656 has a first edge 662 and, in some examples, a second edge 664. Core 658 has a first edge 666 and, in some examples, a second edge 668. The first edges 662, 666 are spaced apart from one another and define a region therebetween to form a bore bridge. The second edges 664, 668, when included, are spaced apart from one another and define a region therebetween to form another bore bridge on the other side of the cylinder liner (when the cylinder is an inner cylinder; in other examples, the cores 656 and 658 may merge behind the cylinder liner 626 such that the coolant jacket, once cast, surround the remainder of the cylinder). The first edges 662, 666 of the cores along with an edge of the support member form a mating surface 670. Mating surface 670 cooperates with another mating surface formed by the second edges and an edge of a support member of another adjacent die, at least in some examples.

The support member 654 includes a recess in which a secondary support member 602 may be positioned, between the first and second cores 656, 658. The secondary support member 602 may form a base for and fix a curved bore pin 604 to the die 652. The curved bore pin 604 may be adapted to form a bore bridge cooling channel (e.g., the first cooling passage 310 of FIGS. 3 and 5). For example, after the curved bore pin 604 is positioned on the die 652 as shown in FIG. 6, the tool 650 is closed, and the engine component is die cast by injecting molten metal into the tool 650. The die 652 may be a cover die or an ejector die, that cooperates with the other component to form a mold cavity to form the engine component. The molten metal may be aluminum, an aluminum alloy, or another suitable material. The molten metal is injected at a high pressure, i.e. 20,000 psi, to form the engine component. The molten metal may be injected at a pressure greater than or less than 20,000 psi, for example, in the range of 15000-30000 psi, and may be based on the metal or metal alloy in use, the shape of the mold cavity, and other considerations. The molten metal flows around the curved bore pin 604, and forms a casting skin around the bore pin. The curved bore pin 604 may be comprised of premium metal or alloy and/or include internal cooling mechanisms, which may reduce sticking/locking of the bore pin during removal of the bore pin.

As shown in FIG. 6, the curved bore pin 604 may be removed after casting by rotating the curved bore pin 604 around an axis of rotation 606, for example along an arc 608. Additionally, FIG. 6 illustrates a radius of curvature R1 of the curved bore pin 604. The radius of curvature R1 may result in the first cooling passage having the curvature C1 described above, and thus the radius of curvature R1 may be selected based on manufacturing constraints (e.g., ease of removal after casting), piston size (e.g., the piston width, which dictates the length of the bore bridge), and/or a desired flow path of the coolant through the bore bridge (e.g., along nearly the entirety of the length of the bore bridge while traversing the secondary hot spot). In an example, the radius of curvature R1 may be in a range of 40-50 mm (and thus a curvature of 0.020-0.025 mm), but other radii are possible without departing from the scope of this disclosure. The size and curvature of the bore pin is thus selected to reduce the distance to cooling on the deck face while also creating a shape that can be pulled after casting without causing a die lock. The curved bore pin may then be formed between those two constraints, e.g., the curved bore pin cannot be too big or the pin may not fit within the space and the vertical position may be set by the desire to pull the pin as high as possible without creating a low point.

In order to form the fluidic connection between the coolant jacket and the first cooling passage that is formed by the curved bore pin, the curved bore pin 604 may interlock with a corresponding aperture in the core 656. For example, a tip of the curved bore pin 604 may sit in an aperture of the core 656 during casting. When the curved bore pin 604 is subsequently removed, the fluidic coupling between the result coolant jacket and the first cooling passage may be established. In other examples, the tip of the curved bore pin 604 may terminate near the outer surface of the core (e.g., near edge 662), such as within 1-2 mm of the edge 662, or the tip of the curved bore pin 604 may be in face-sharing contact with the edge 662. After casting, the curved bore pin 604 is removed as described and any solidified metal that is present between the resultant coolant jacket and first cooling passage may be removed by drilling (e.g., the inner surface of the coolant jacket may be drilled/machined until fluidic connection is established between the coolant jacket and the first cooling passage).

By fixing the curved bore pin 604 to the die 652 and casting the first cooling passage using the curved bore pin 604, the accuracy and confidence of the positioning of the first cooling passage may be improved relative to bore bridge cooling passages that are drilled. As a result, the outlet of the first cooling passage may be made larger than drilled outlets, as the confidence of the positioning of the outlet is improved. In contrast, drilled passages may be limited in outlet size, in order to provide extra tolerance/margin for aligning the outlet with the corresponding hole in the head gasket.

Figure 9:
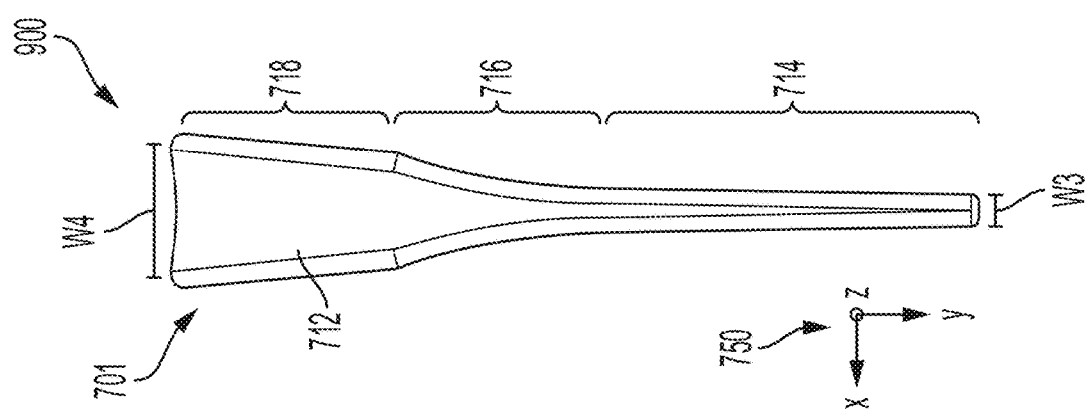
FIGS. 7-9 show an example curved bore pin.
Figure 8:
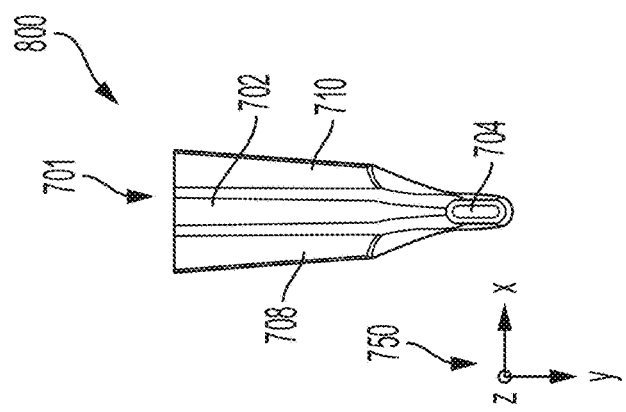
Figure 7:
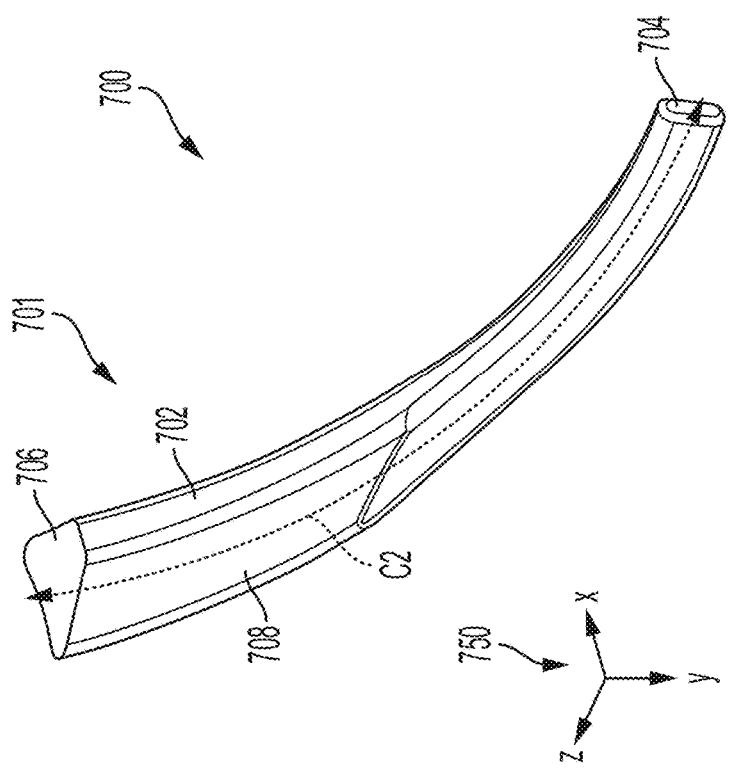

FIGS. 7-9 show an example curved bore pin 701 that may be included on a die in order to cast the first cooling passage shown 310 in FIG. 3. FIG. 7 is a perspective view 700 of the curved bore pin 701, FIG. 8 is a front view 800 of the curved bore pin 701, and FIG. 9 is a back view 900 of the curved bore pin 701. Each of FIGS. 7-9 includes a coordinate system 750. Curved bore pin 701 is a non-limiting example of curved bore pin 604 of FIG. 6. FIGS. 7-9 will be described collectively.

The curved bore pin 701 includes a front surface 702, a tip surface 704, a top surface 706, a first side surface 708, a second side surface 710, and a rear surface 712. The tip surface 704 may be configured to be positioned near or in contact with a core of a tool/die (e.g., at, near, or contacting the first edge 662 of the first core 656) and the top surface 706 may be configured to be coupled to a base, a secondary support member, or another component that may act to accurately position the curved bore pin on the tool/die during casting and also facilitate removal of the curved bore pin 701 after casting.

The front surface 702, first side surface 708, second surface 710, and the rear surface 712 may each extend from the top surface 706 to the tip surface 704. The first side surface 708 may be positioned on an opposite side of the curved bore pin 701 as the second side surface 710, and the front surface 702 may be positioned on an opposite side of the curved bore pin 701 as the rear surface 712. Each of the front surface 702, the first side surface 708, the second side surface 710, and the rear surface 712 may curve upward from the tip surface 704 to the top surface 706, thereby providing the curved bore pin 701 with a curvature C2.

The tip surface 704 may have a third width W3 (shown in FIG. 9) extending along the x axis of coordinate system 750 from the first side surface 708 to the second side surface 710. The top surface 706 may have a fourth width W4 extending along the x axis from the first side surface 708 to the second side surface 710. The fourth width W4 may be larger than the third width W3, such as in a range of 2-5 times as large as the third width W3. As a result, when the first cooling passage is cast using the curved bore pin 701, the inlet (formed by where the tip surface 704 meets the core for casting the coolant jacket) may have a width (e.g., W1 of FIG. 5) that is equal to the third width W3 and the outlet (formed by the top surface 706) may have a width (e.g., W2 of FIG. 5) that is equal to the fourth width W4.

As further appreciated by FIGS. 7-9, the change in width of the curved bore pin 701 may be unequal across the length of the curved bore pin 701. For example, as shown in FIG. 9, the rear surface 712 of the curved bore pin 701 may include a first portion 714, a second portion 716, and a third portion 718, where the first portion 714 extends from the tip surface 704 to the second portion 716 and the third portion 718 extends from the second portion 716 to the top surface 706. The rear surface 712 may increase in width by a relatively small amount along the first portion 714 (e.g., increasing by 50%), according to a first function (e.g., linearly). The rear surface 712 may increase in width by a larger amount along the second portion 716 (e.g., increasing by 100% or more), according to a second function (e.g., exponentially). The rear surface 712 may increase in width by a smaller amount along the third portion 718 (e.g., increasing by 50-75%), according to the first function. However, the above description of the change in the width of the rear surface 712 of the curved bore pin 701 is exemplary, and other changes in width (e.g., linearly across the entirety of the rear surface) are within the scope of this disclosure.

Additionally, the shape of the curved bore pin 701 may also change along the length of the curved bore pin 701. For example, the tip surface 704 may have a generally oval shape (e.g., as shown in FIG. 8), while the top surface 706 may have a generally rounded triangular shape (e.g., as shown in FIG. 7). This change in shape may result from the rear surface 712 changing in width by a larger degree than the front surface 702. Further, in some examples, the front surface 702 may increase in width linearly along the length of the curved bore pin 701.

Figure 10:
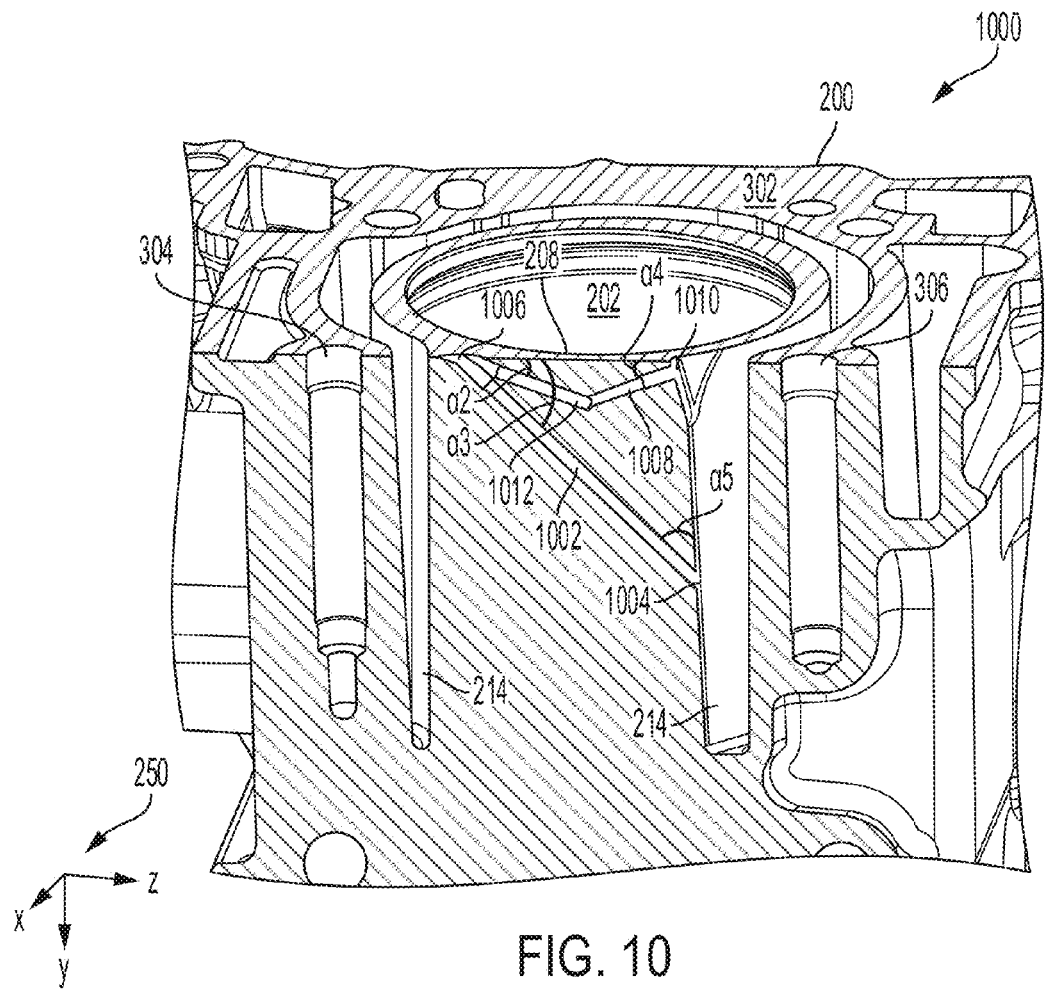
FIG. 10 shows a cross-sectional view of a bore bridge of a cylinder block according to another embodiment of the disclosure.
Figure 11:
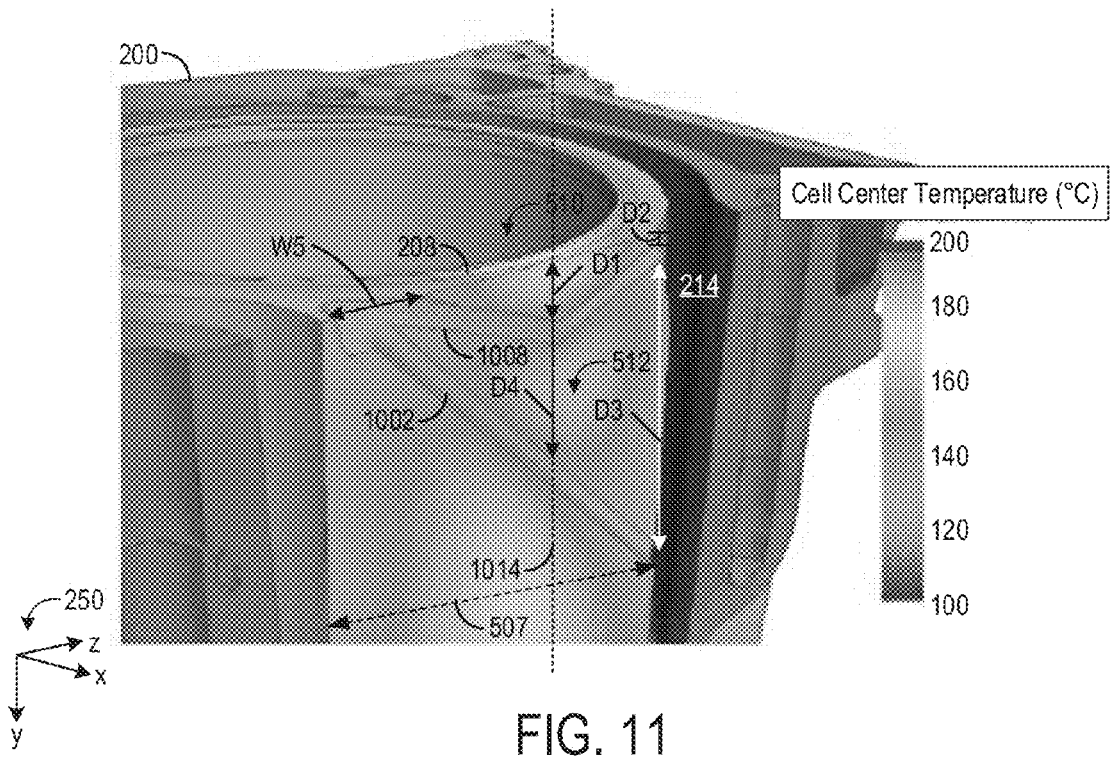
FIG. 11 shows a cross-sectional view of the bore bridge of FIG. 10 with a temperature gradient.

FIGS. 10 and 11 show bore bridge cooling passages according to another embodiment of the disclosure. FIG. 10 shows a cross-sectional view 1000 of the cylinder block 200 from a first angle (taken across line A-A' of FIG. 2) while FIG. 11 shows a cross-sectional view 1100 of the cylinder block 200 from a second angle, with temperature gradients of the cylinder block.

The cylinder block 200 shown in FIG. 10 is the same as the cylinder block 200 shown in FIG. 3, other than the differences in the bore bridge cooling passages, and thus like components are numbered similarly and are not re-introduced. In the embodiment shown in FIG. 10, the set of bore bridge cooling passages includes two drilled passages rather a curved cooling passage. Thus, as shown, the set of cooling passages in the bore bridge 208 includes a first cooling passage 1002 having a first inlet 1004 fluidly coupled to the coolant jacket 214 and a common outlet 1006 at the deck face 302. The first cooling passage 1002 extends in a straight line without curves or bends from the first inlet 1004 to the common outlet 1006.

The set of cooling passages further includes a second cooling passage 1008 having a second inlet 1010 fluidly coupled to the coolant jacket 214 and terminating at the common outlet 1006. The second cooling passage 1008 is V-shaped, such that the second cooling passage 1008 extends from the second inlet 1010 to an apex 1012 and then from the apex 1012 to the common outlet 1006. The apex 1012 is positioned at a first distance D1 (shown in FIG. 11) vertically below the deck face 302 and the second inlet 1010 is positioned at a second distance D2 (shown in FIG. 11) vertically below the deck face 302, where D1 is greater than D2. Additionally, as shown in FIG. 11, the first inlet 1004 is positioned at a third distance D3 vertically below the second inlet 1010, where D3 is greater than both D1 and D2. Additionally, along an axis 1014 that bisects the apex 1012 and a midpoint of the first cooling passage, a first vertical distance D4 from the deck face 302 to the midpoint along the axis 1014 is at least twice as large as D1, which is a second vertical distance from the deck face 302 to the apex 1012 along the axis 1014. The midpoint and the first cooling passage around the midpoint may be positioned at the second hot spot, thereby providing cooling to the second hot spot.

In this way, when coolant is flowing through the coolant jacket 214, coolant enters the first cooling passage 1002 via the first inlet 1004 and flows to the common outlet 1006 in a vertically upward manner. Coolant may enter the second inlet 1010 and flow through the second cooling passage 1008 in two directions: a first direction angled vertically downward from the second inlet 1010 to the apex 1012 (which is vertically below the second inlet 1010) and a second direction angled vertically upward from the apex 1012 to the common outlet 1006 (which is positioned vertically above the apex 1012). All coolant flowing through the first cooling passage 1002 and the second cooling passage 1008 exits the cylinder block at the common outlet 1006. Further, coolant flowing through the first cooling passage 1002 is maintained fluidly separate from coolant flowing through the second cooling passage 1008, until the coolant in both passages mixes at the common outlet 1006.

The first cooling passage 1002 may be a deeper passage than the second cooling passage 1008, including angling toward the bottom of the cylinder block (e.g., the crankshaft/pistons) at a larger angle and having an inlet positioned deeper in the bore bridge. For example, as shown in FIG. 10, the second cooling passage 1008 may extend toward the common outlet 1006 at an outlet angle $\alpha 2$ relative to the horizontal plane of the deck face 302, while the first cooling passage 1002 may extend toward the common outlet 1006 at an outlet angle $\alpha 3$ relative to the horizontal plane of the deck face 302. The outlet angle $\alpha 2$ of the second cooling passage 1008 may be shallower/smaller than the outlet angle $\alpha 3$ of the first cooling passage 1002. For example, the angle $\alpha 3$ may be 45° and the angle $\alpha 2$ may be 30°. Additionally, the second cooling passage 1008 may extend from the second inlet 1008 to the apex 1012 with an inlet angle $\alpha 4$ relative to the vertical axis (e.g., y axis), which may be equal (or within a threshold range, such as within 5% of) to the outlet angle $\alpha 2$. The first cooling passage 1002 may extend from the first inlet 1004 to the common outlet 1006 with an inlet angle $\alpha 5$ relative to the vertical axis (e.g., y axis), which may be equal to or within a threshold range of the outlet angle $\alpha 3$.

The common outlet 1006 may have a width W5 (shown in FIG. 11) that is wider than a width of the first cooling passage 1002 and also wider than a width of the second cooling passage 1008. In some examples, the width W5 may be larger than the combined width of the first cooling passage 1002 and the second cooling passage 1008. The increased width of the common outlet 1006 may provide for increased coolant flow through the cooling passages and mixing of the coolant at the common outlet 1006, relative to a common outlet having a narrower width (e.g., the same width as the first or second cooling passage).

The first cooling passage 1002 may extend (e.g., with a horizontal component) across most of the length 507 of the first bore bridge 208. The first cooling passage 1002 may extend across at least 50% and up to 99% of the length 507 of the first bore bridge 208. For example, the outer edge of the first cooling passage 1002 at the common outlet 1006 may be spaced from a terminating edge of the bore bridge 208 by an amount (e.g., 1-5 mm) that is 1-49% of the length 507. In this way, the common outlet may be separated from the coolant jacket 214 by the bore bridge with a separation width that is between 1-49% of a length of the bore bridge along the deck face. In some examples, the separation width may be 1-10% of the length 507, such that the common outlet is positioned as close as possible to the edge of the bore bridge, without being in fluid contact with the coolant jacket 214 at the outlet side of the first cooling passage 1002.

Each of the first cooling passage 1002 and the second cooling passage 1008 may be formed after casting of the cylinder block by drilling. For example, the second cooling passage 1008 may be a cross-drilled passage where a first portion (e.g., from the inlet to the apex) is drilled with a first drilling process and a second portion (e.g., from the outlet to the apex) is drilled with a second drilling process, and the first cooling passage 1002 is drilled (e.g., from the outlet to the inlet) with a third drilling process. In some examples, the common outlet 1006 may also be formed via drilling after casting. In other examples, the common outlet 1006 may be at least partially formed during casting.

The deeper angling of the first cooling passage 1002 may target coolant flow to the second hot spot. As shown in FIG. 11, the temperature at the second region 512 may be maintained at or below about 170° C. during high load operation. Further, the inclusion of the cross-drilled second cooling passage 1008 may sufficiently cool the deck face, as shown by the low temperatures of the first region 510 (e.g., at or below 170° C.).

While FIGS. 10 and 11 illustrate a single bore bridge having the described first and second cooling passages, it is to be appreciated that each bore bridge of the cylinder block 200 (e.g., bore bridge 208 and bore bridge 210) may have identical or similar bore bridge cooling passages.

The examples of cooling passages disposed in a bore bridge of a cylinder block described above, with respect to FIGS. 10-11, may rely on passages with circular cross-sections due to techniques by which the cooling passages are formed. In some instances, a cooling passage with a non-circular cross-section may allow a target cylinder bore region to be cooled more effectively, e.g., the second region 412 of FIG. 4, while allowing a geometry of the cooling passage to be readily modified. As such, dimensions of the cooling passage may be contoured according to a thickness and shape of the bore bridge. In one example, the cooling passage may be formed using lost core molding.

Figure 12:
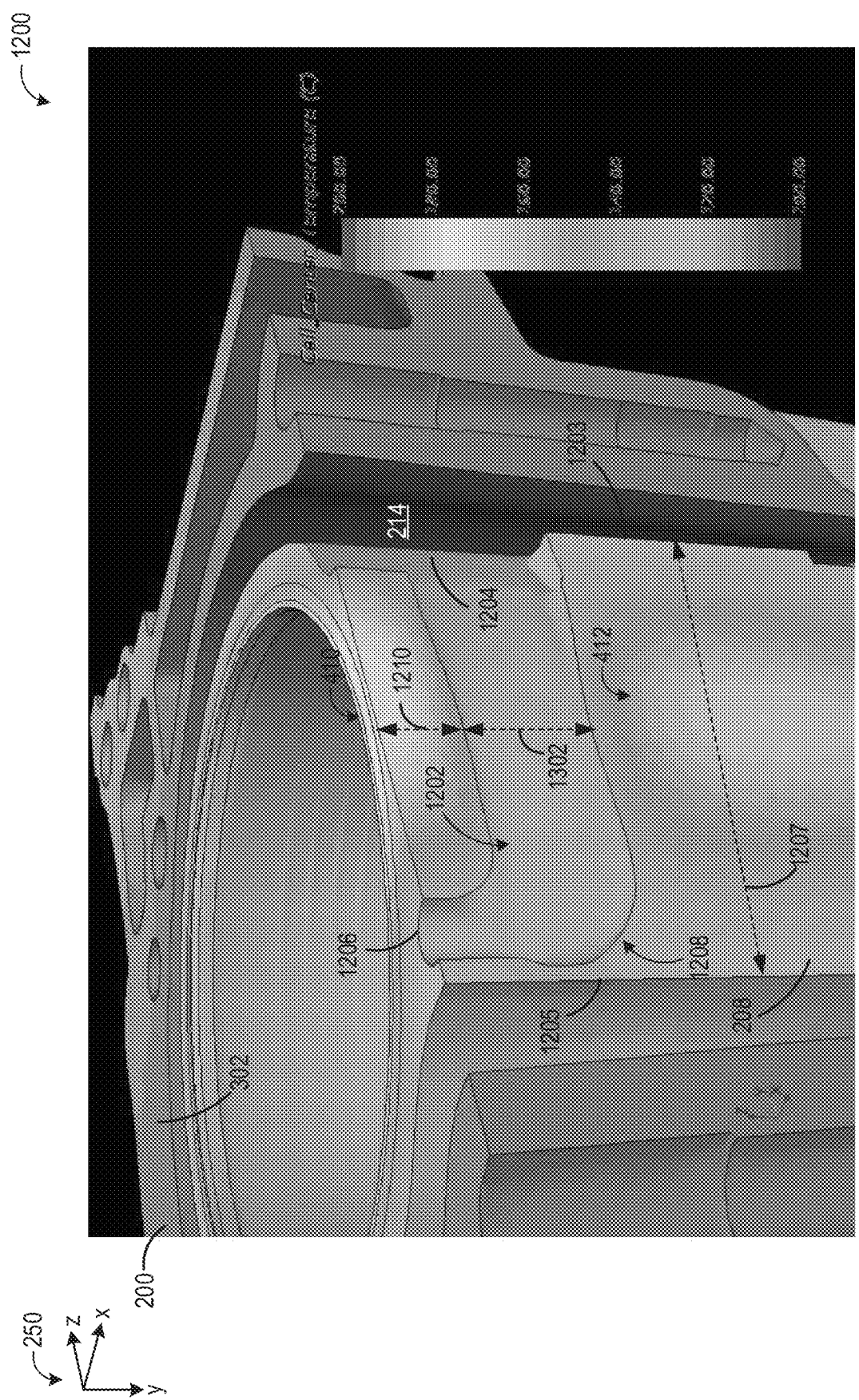
FIG. 12 shows a cross-sectional view of an example of a bore bridge of a cylinder block where the bore bridge may be formed using a lost core.

Lost core molding utilizes a lost core that is removed after molding or casting of a target component is complete. As one example, the lost core may be a glass-filled salt core but may be another type of lost core, such as a sand core, a foam core, etc., in other examples. The use of the lost core to control the shape of the cooling passage may allow a greater surface area of the cylinder bore to be directly cooled by coolant than machined cooling passages. Another embodiment of a cooling passage 1202 formed by a lost core is depicted in FIG. 12 in a cross-sectional view 1200 of the cylinder block 200 of FIG. 2. The cross-sectional view 1200 shows a cross-section of the cylinder block 200 taken along line A-A' of FIG. 2.

The cooling passage 1202 has an inlet 1204 directly coupled, e.g., fluidly coupled, to coolant jacket 214 through which coolant flows into the cooling passage 1202. Coolant exits the cooling passage 1202 at an outlet 1206 at the deck face 302 of the cylinder block 200. The cooling passage 1202 includes a bend 1208 which may route coolant flow through a 90 degree turn such that a cross-section of the inlet 1204 is perpendicular to a cross-section of the outlet 1206. Furthermore, the cooling passage 1202 is fluidly coupled to the coolant jacket 214 at a first side 1203 of the first bore bridge 208 but is not fluidly coupled to the coolant jacket 214 at a second side 1205 of the first bore bridge 208. The cooling passage 1202 may extend across most of a length 1207 of the first bore bridge 208, the length 1207 defined along the z-axis, such as across at least 50% and up to 90% of the length 1207 of the first bore bridge 208.

Figure 13:
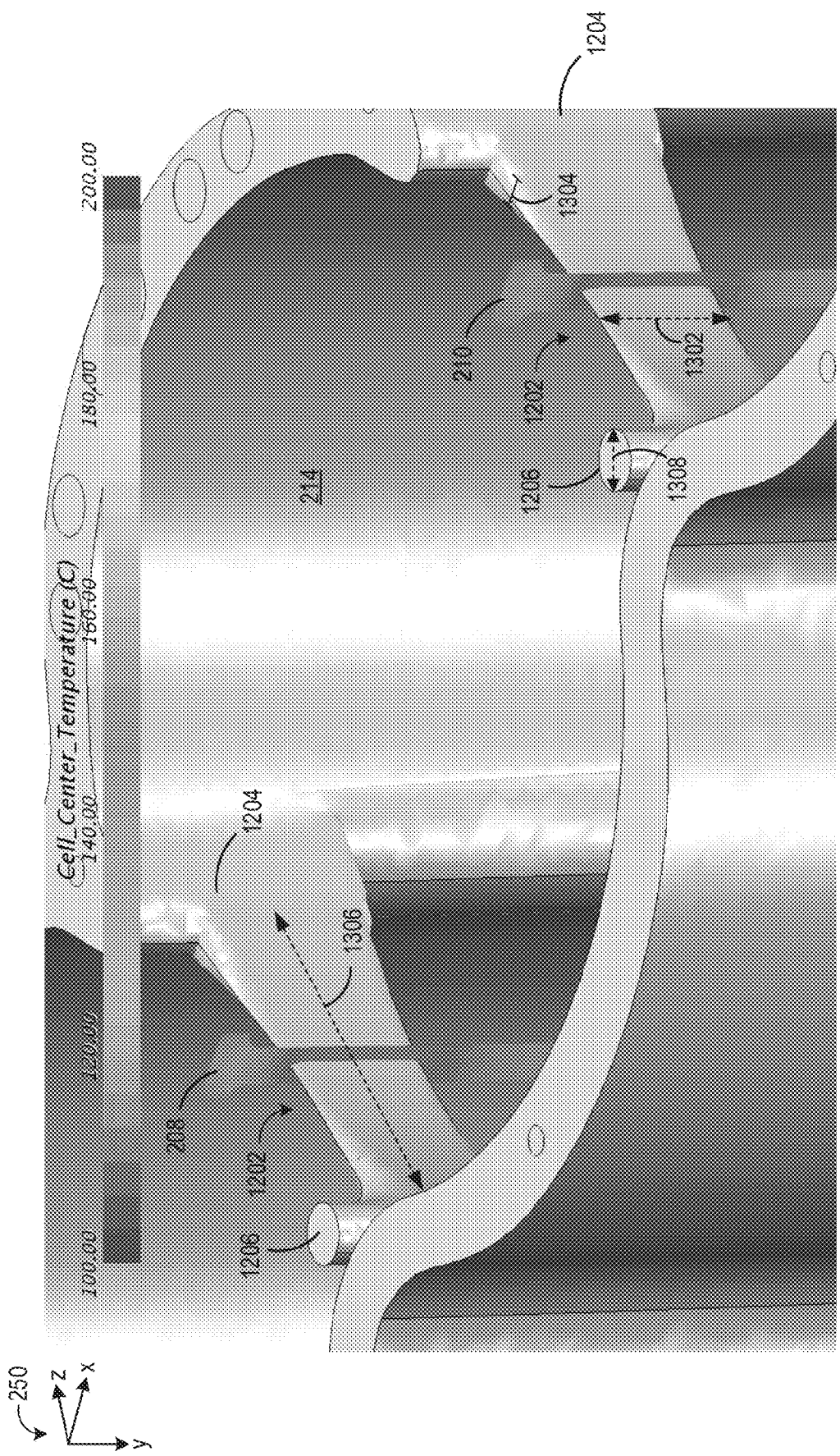
FIG. 13 shows an example of a coolant jacket coupled to the cooling passage of FIG. 12.

A shape of the cooling passage 1202 may be configured such that at least a portion of the cooling passage 1202 does not have a circular cross-section, e.g., the cooling passage 1202 is non-cylindrical. A geometry of the cooling passage 1202 is shown in greater detail in FIG. 13. Coolant jacket 214 is depicted in FIG. 13 and the cooling passage 1202 is shown extending along each bore bridge of the cylinder block, coupled to coolant jacket 214 at the inlet 1204 of each cooling passage 1202. The outlet 1206 of the cooling passage 1202 has a circular cross-section. At a mid-portion of the cooling passage 1202 between the inlet 1204 and the outlet 1206, a depth 1302 is greater than a width 1304 of the cooling passage 1202, where the depth 1302 is defined along the y-axis and the width 1304 is defined along the x-axis. The depth 1302 may remain relatively uniform along a portion of a length 1306 of the cooling passage 1202, the length 1306 defined along the z-axis, between the inlet 1204 and the outlet 1206. However, the width 1304 may vary, being narrowest at a mid-point along the length 1306 and tapering to become wider at the inlet 1204 and at the outlet 1206.

The width 1304 of the cooling passage 1202 may be adjusted according to a thickness of the bore bridge. For example, increasing the thickness of the bore bridge may allow the width 1304 of the cooling passage 1202 to be increased. The width 1304 may be optimized to provide a maximum volume of the cooling passage 1202 in the bore bridge without compromising a structural integrity of the bore bridge.

By increasing the depth 1302 of the cooling passage 1202 relative to the width 1304, the coolant may contact a greater surface area of the cylinder walls, enhancing a cooling effect of the cooling passage 1202. Adapting the geometry of the cooling passage 1202 with the bend 1208 allows the cooling passage 1202 to extend further down along a depth, e.g., along the y-axis, of the cylinder from the deck face 302, while also allowing the cooling passage 1202 to extend horizontally (e.g., along the z axis) along a substantially straight line for the majority of the length of the bore bridge, before the bend 1208 directs the coolant flow in a vertical direction. Thus a region of the cylinder prone to elevated temperatures, such as the second region 412 shown in FIG. 4, may be more efficiently cooled by the cooling passage 1202.

For example, as shown in FIG. 12, a temperature at the deck face 302 at the first region 410 may be similarly reduced as shown in FIG. 4 when the conventional cooling passage 406 is implemented. However, at the second region 412, the extension of the cooling passage 1202 of FIG. 12 into a depth of the bore bridge, e.g., downwards with respect to the y-axis, enables the cooling passage 1202 to also affect a temperature of the first bore bridge 208 at the second region 412. The temperature at the second region 412 is reduced when the cooling passage 1202 is disposed in the first bore bridge 208 compared to the temperature at the second region 412 when the conventional cooling passage 406 is incorporated (as shown in FIG. 4). For example, the temperature at the second region 412 may be reduced by 50 degrees C. by the non-cylindrical cooling passage 1202. The effect of the cooling passage 1202 on temperature at the first bore bridge 208 as well as the second bore bridge 210 is also shown in FIG. 13.

Coolant jacket 214 is depicted in FIG. 13 with the cooling passage 1202 fluidly coupled to the coolant jacket 214 at the inlet 1204 and extending through the first bore bridge 208 and the second bore bridge 210. The first and second bore bridges 208, 210 are shown as cross-sectional slices in FIG. 13. A temperature of each of the bore bridges is lowest proximate to the cooling passage 1202 and increases in an upward direction along the y-axis, towards the deck face of the cylinder block (e.g., the deck face 302 shown in FIGS. 3, 10, and 12) as well as in the downward direction, deeper along the depth of the cylinder block. An increase in temperature away from the cooling passage 1202 is reduced in the downward direction relative to the upward direction, indicating how modification of the geometry of the cooling passage 1202 may result in enhanced heat extraction in a target region of the bore bridge.

The depth 1302 of the cooling passage 1202 at the inlet 1204 may be greater than a diameter 1308, as shown in FIG. 13, of the outlet 1206 while the width 1304 of the inlet 1204 may be similar to the diameter 1308 of the outlet 1206. In other words, the cross-section of the inlet 1204 may have a larger area than the cross-section of the outlet 1206. As a result, a greater volume of coolant may flow into the cooling passage 1202 than a volume of coolant concurrently exiting the cooling passage 1202. Thus a bottleneck created by the outlet 1206 may increase a residence time of the coolant in the mid-region of the cooling passage 1202, enabling increased cooling at a mid-region of the cylinder bore along the bore bridge (e.g., the second region 412 as shown in FIG. 4) due to the larger coolant volume at the inlet 1204 while also allowing the bore bridge to be cooled near the deck face 302.

Furthermore, both a cross-sectional area and a hydraulic area of the cooling passage 1202 may be greater upstream of the outlet 1206 than at the outlet 1206. Additionally, increasing a useful hydraulic area at the inlet 1204 may enhance efficient bore bridge cooling. For example, a useful flow area of the cooling passage 1202, having a rectangular cross-section, may be smaller than a useful flow area of the outlet 1206, having a circular cross-section, due to an influence of a no-slip condition imposed by walls (e.g., inner surfaces) of the cooling passage 1202. As such, an area of the inlet 1204, e.g., cross-sectional area, may be increased to offset the no-slip boundary conditions at a wall of the inlet 1204 and through the cooling passage 1202, where ⅓ of a cross-sectional width or height of an opening or passage may be an un-usable portion of a flow field.

Additionally, as shown in FIG. 12, the cooling passage 1202 may be relatively deep, compared to traditional drilled passages, which may facilitate cooling of both the deck face 302 and the secondary hot spot with a single passage. For example, an upper edge of the cooling passage 1202 may be positioned at a distance 1210 below the deck face 302, where the distance 1210 is similar to the distance D1 shown in FIG. 11 (e.g., equal to or within 5-10% of D1). The depth 1302 at a midpoint of the cooling passage 1202 (e.g., approximately equidistant from the inlet and the outlet) may be larger than the distance 1202, such as 50-75% larger than the distance 1202. In this way, a lower edge of the cooling passage 1202 may be positioned proximate the secondary hot spot.

It will be appreciated that the cooling passage 1202 shown in FIGS. 12 and 13 is a non-limiting example and variations in a geometry of the cooling passage have been contemplated. For example, shapes of the inlet and outlet may vary, the depth of the cooling passage relative to the width may vary, as well as the extent to which the cooling passage extends along the depth of the cylinder. Furthermore, some examples may include more than one cooling passage in each bore bridge of the cylinder block. For example, one or more additional cooling passage may be drilled in the bore bridge after casting. As an example, an additional passage may be drilled into the bore bridge proximate to the deck face, e.g., between the cooling passage of FIGS. 12 and 13 and the deck face of the cylinder block.

While FIGS. 12 and 13 illustrate a single bore bridge having the described cooling passage, it is to be appreciated that each bore bridge of the cylinder block 200 (e.g., bore bridge 208 and bore bridge 210) may have identical or similar bore bridge cooling passages.

Figure 14:
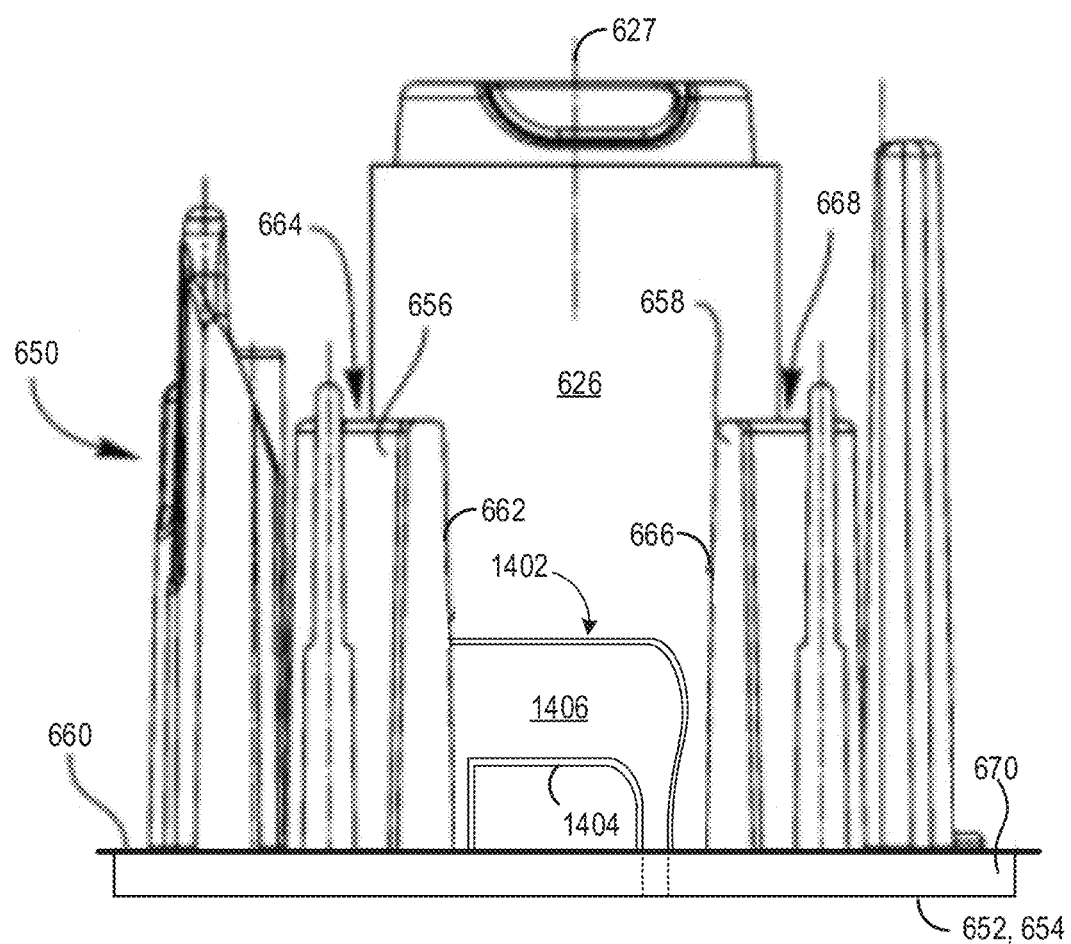
FIG. 14 schematically shows an example die including a lost core, where the die and lost core may be used to cast aspects of the cylinder block of FIG. 2.

Incorporation of the cooling passage 1202 into the cylinder block may be achieved by adapting a high pressure die tool with a lost core. While machining cooling passages constrains passage geometry to cylindrical channels, use of the lost core allows the cooling passages to adopt a variety of shapes and sizes. For example, the tool 650 of FIG. 6 may be a high pressure die tool fitted with an insert 1402, as shown in FIG. 14. The insert 1402 is positioned between the first edges 662, 666 of the tool 650 and includes a shell 1404 surrounding a lost core 1406. The shell 1404 may be formed of a similar material as the cylinder block and may be coupled to the tool 650 by a retaining mechanism. The lost core 1406, as described above, may be a glass-filled salt core.

During die casting of the cylinder block, the insert 1402 occupies a volume of the cylinder block. When casting is complete, the lost core 1406 may be removed by, for example, flushing with a high pressure fluid while the shell 1404 is integrated into the material of the cylinder block. However, other techniques for eliminating the sand core may be used. A remaining cavity once the lost core 1406 is removed forms the cooling passage 1202.

In this way, a cooling passage may be formed in a bore bridge of a cylinder block. By forming the cooling passage using a lost core rather than by machining, the cooling passage may have a non-cylindrical geometry. The non-cylindrical geometry may allow coolant to absorb heat from the bore bridge across a larger surface area than a cooling passage with a circular cross-section. Regions of the cylinder prone to elevated temperatures may be targeted by adjusting the shape of the cooling passage which is readily achieved during manufacturing of the cylinder by use of lost core molding. The cooling passage geometry may thereby be optimized for the bore bridge via a low cost and efficient method to maintain a fuel economy of a vehicle and prolong a useful life of the cylinder block components.

FIGS. 1-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a system, comprising: a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder, and at least one cooling passage positioned within the bore bridge, the at least one cooling passage including an inlet fluidly coupled to the coolant jacket and having a larger area than an outlet positioned at a deck face of the cylinder block, wherein at least a portion of the at least one cooling passage has a non-cylindrical geometry formed by a lost core. In a first example of the system, the inlet is arranged perpendicular to the outlet and the at least one cooling passage includes a bend configured to alter a direction of coolant flow within the at least one cooling passage. In a second example of the system, optionally including the first example, the portion of the at least one cooling passage with the non-cylindrical geometry has a greater depth than width, the depth defined along a cylinder axis of the cylinder block and the width perpendicular to the depth. In a third example of the system, optionally including the first and second examples, the width of the at least one cooling passage varies along a length of the at least one cooling passage. In a fourth example of the system, optionally including the first through third examples, the depth of the at least one cooling passage remains uniform along a portion of a length of the at least one cooling passage between the inlet and the outlet. In a fifth example of the system, optionally including the first through fourth examples, the at least one cooling passage is fluidly coupled to the coolant jacket at a first side of the bore bridge but not at a second side of the bore bridge and wherein the at least one cooling passage extends across at least a portion of a length of the bore bridge. In a sixth example of the system, optionally including the first through fifth examples, a cross-section of the outlet is circular and a cross-section of the inlet is not circular and wherein the cross-section of the outlet is perpendicular to the cross-section of the inlet. In a seventh example of the system, optionally including the first through sixth examples, the lost core is a glass-filled salt core.

The disclosure also provides support for a system, comprising: a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder, and a set of cooling passages positioned within the bore bridge, the set of cooling passages including a first cooling passage having a first inlet fluidly coupled to the coolant jacket and a second cooling passage having a second inlet fluidly coupled to the coolant jacket, vertically above the first inlet, each of the first cooling passage and the second cooling passage terminating at a common outlet positioned at a deck face of the cylinder block, the first cooling passage extending from the first inlet to the common outlet in a substantially straight line and the second cooling passage including a first portion extending from the second inlet to an apex of the second cooling passage and a second portion extending from the apex to the common outlet. In a first example of the system, the first portion extends from the second inlet to the apex at a first angle away from the deck face and the second portion extends from the apex to the common outlet at a second angle toward the deck face. In a second example of the system, optionally including the first example, the first passage extends from the first inlet to the common outlet at a third angle toward the deck face, and wherein the third angle is different than the second angle. In a third example of the system, optionally including the first and second examples, the first cooling passage and the second cooling passage are maintained fluidly separate from each other from the first inlet and the second inlet to the common outlet and are only fluidly coupled at the common outlet. In a fourth example of the system, optionally including the first through third examples, the cylinder block is coupled to a cylinder head via a gasket, and the gasket includes a hole aligned with the common outlet. In a fifth example of the system, optionally including the first through fourth examples, the common outlet has a width that is greater than a combined width of the first cooling passage and the second cooling passage.

The disclosure also provides support for a system, comprising: a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder, and a set of cooling passages positioned within the bore bridge, the set of cooling passages including a first cooling passage having a first inlet fluidly coupled to the coolant jacket and a second cooling passage having a second inlet fluidly coupled to the coolant jacket, vertically above the first inlet, each of the first cooling passage and the second cooling passage terminating at a common outlet positioned at a deck face of the cylinder block, the first cooling passage extending from the first inlet to the common outlet in a substantially straight line and the second cooling passage including an apex positioned vertically below the second inlet and the common outlet, where an axis bisects the apex and a midpoint of the first cooling passage, and a first vertical distance from the deck face to the midpoint along the axis is at least twice as large as a second vertical distance from the deck face to the apex along the axis. In a first example of the system, the first cooling passage and the second cooling passage are maintained fluidly separate from each other from the first inlet and the second inlet to the common outlet and are only fluidly coupled at the common outlet. In a second example of the system, optionally including the first example, the deck face extends in a horizontal plane, wherein the first cooling passage extends to the common outlet at a first outlet angle relative to the horizontal plane, and wherein the second cooling passage extends to the common outlet at a second outlet angle relative to the horizontal plane, the second outlet angle shallower than the first outlet angle. In a third example of the system, optionally including the first and second examples, the cylinder block is coupled to a cylinder head via a gasket, and the gasket includes a hole aligned with the common outlet. In a fourth example of the system, optionally including the first through third examples, the common outlet has a width that is greater than a combined width of the first cooling passage and the second cooling passage. In a fifth example of the system, optionally including the first through fourth examples, the common outlet is separated from the coolant jacket by the bore bridge with a separation width that is between 1-10% of a length of the bore bridge along the deck face.

This disclosure provides support for a system including a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder; and a cooling passage positioned within the bore bridge, the cooling passage including an inlet fluidly coupled to the coolant jacket and an outlet positioned at a deck face of the cylinder block, the cooling passage curving from the inlet to the outlet with a curvature greater than zero. In a first example of the system, the cooling passage is a first cooling passage, the inlet is a first inlet, and the outlet is a first outlet, and the system further includes a second cooling passage positioned within the bore bridge, a second inlet of the second cooling passage fluidly coupled to the coolant jacket and a second outlet of the second cooling passage fluidly coupled to the first cooling passage. In a second example of the system, optionally including the first example, the second cooling passage is substantially straight from the second inlet to the second outlet. In a third example of the system, optionally including one or both of the first and second examples, the second inlet is positioned vertically above the first inlet and the second outlet is positioned vertically below the second inlet, and the first outlet is positioned vertically above the first inlet, the second inlet, and the second outlet. In fourth example of the system, optionally including one or more or each of the first through third examples, the deck face of the cylinder block extends along a horizontal plane, and wherein the second cooling passage extends from the second inlet to the second outlet at an angle in a range of 20-50° relative to the horizontal plane. In fifth example of the system, optionally including one or more or each of the first through fourth examples, the cooling passage has a first cross-sectional area at the inlet and a second cross-sectional area at the outlet, the first cross-sectional area less than the second cross-sectional area. In sixth example of the system, optionally including one or more or each of the first through fifth examples, the cylinder block is coupled to a cylinder head via a gasket, and the gasket includes a hole aligned with the outlet. In seventh example of the system, optionally including one or more or each of the first through sixth examples, the cooling passage curves from the inlet to the outlet with the curvature being greater zero along an entirety of the cooling passage.

This disclosure also provides support for a system including a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder; a first cooling passage positioned within the bore bridge, the first cooling passage including a first inlet fluidly coupled to the coolant jacket and a first outlet positioned at a deck face of the cylinder block, the first cooling passage curving from the first inlet to the first outlet with a curvature greater than zero and increasing in cross-sectional area from the first inlet to the first outlet; and a second cooling passage positioned within the bore bridge, the second cooling passage including a second inlet fluidly coupled to the coolant jacket and a second outlet fluidly coupled to the first cooling passage. In a first example of the system, the second cooling passage is substantially straight from the second inlet to the second outlet. In a second example of the system, optionally including the first example, the second inlet is positioned vertically above the first inlet and the second outlet is positioned vertically below the second inlet, and the first outlet is positioned vertically above the first inlet, the second inlet, and the second outlet. In a third example of the system, optionally including one or both of the first and second examples, the deck face of the cylinder block extends along a horizontal plane, and wherein the second cooling passage extends from the second inlet to the second outlet at an angle in a range of 20-50° relative to the horizontal plane. In fourth example of the system, optionally including one or more or each of the first through third examples, the cylinder block is coupled to a cylinder head via a gasket, and the gasket includes a hole aligned with the first outlet. In fifth example of the system, optionally including one or more or each of the first through fourth examples, the first cooling passage curves from the first inlet to the first outlet with the curvature being greater zero along an entirety of the first cooling passage. In sixth example of the system, optionally including one or more or each of the first through fifth examples, the bore bridge has a length extending from a first terminating edge of the bore bridge at the deck face to a second terminating edge of the bore bridge at the deck face, and wherein the first outlet is spaced apart from the second terminating edge by an amount that is 1-10% of the length.

This disclosure also provides support for a system including a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder; a first cooling passage positioned within the bore bridge, the first cooling passage including a first inlet fluidly coupled to the coolant jacket and a first outlet positioned at a deck face of the cylinder block, the first cooling passage curving from the first inlet to the first outlet with a curvature greater than zero; and a second cooling passage positioned within the bore bridge, the second cooling passage extending in a substantially straight line from a second inlet fluidly coupled to the coolant jacket to a second outlet fluidly coupled to the first cooling passage, where coolant flowing in the coolant jacket is configured to enter the first cooling passage at the first inlet and exit the first cooling passage at the first outlet and enter the second cooling passage at the second inlet and exit the second cooling passage at the second outlet. In a first example of the system, the cylinder block is coupled to a cylinder head via a gasket, and the gasket includes a hole aligned with the first outlet, and wherein the coolant exiting the first cooling passage is configured to flow to the cylinder head via the hole of the gasket. In a second example of the system, optionally including the first example, the first cooling passage has a first cross-sectional area at the first inlet and a second cross-sectional area at the first outlet, the first cross-sectional area less than the second cross-sectional area. In third example of the system, optionally including one or both of the first and second examples, the deck face of the cylinder block extends along a horizontal plane, and wherein the second cooling passage extends from the second inlet to the second outlet at an angle in a range of 20-50° relative to the horizontal plane. In fourth example of the system, optionally including one or more or each of the first through third examples, the second cooling passage fluidly couples to the first cooling passage via the second outlet at a secondary inlet of the first cooling passage, the secondary inlet positioned closer to the first outlet than the first inlet.

In another representation, a method for cooling a cylinder block includes flowing coolant through a cylinder block coolant jacket partially surrounding a first cylinder and a second cylinder of the cylinder block; and flowing coolant from the cylinder block coolant jacket to a cylinder head coolant jacket via a set of cooling passages positioned in a bore bridge intermediate the first cylinder and the second cylinder, including flowing coolant through a curved, first cooling passage of the set of cooling passages from a first inlet fluidly coupled to the cylinder block coolant jacket to a first outlet fluidly coupled to the cylinder head coolant jacket and flowing coolant through a straight, second cooling passage of the set of cooling passages from a second inlet fluidly coupled to the cylinder block coolant jacket to a second outlet terminating at the first cooling passage.

In another representation, a method for cooling a cylinder block includes flowing coolant through a cylinder block coolant jacket partially surrounding a first cylinder and a second cylinder of the cylinder block; and flowing coolant from the cylinder block coolant jacket to a cylinder head coolant jacket via a set of cooling passages positioned in a bore bridge intermediate the first cylinder and the second cylinder, including flowing coolant through a first cooling passage of the set of cooling passages in a constant direction along a substantially straight line from a first inlet fluidly coupled to the cylinder block coolant jacket to a common outlet fluidly coupled to the cylinder head coolant jacket, and flowing coolant through a v-shaped second cooling passage of the set of cooling passages in two different directions from a second inlet fluidly coupled to the cylinder block coolant jacket to the common outlet.

In another representation, a tool for forming an engine component includes a die having a support member defining a first recess positioned between a first core and a second core each adapted to form a cylinder cooling jacket; and a curved bore pin having a first end configured to be received by the first recess and a second end configured to be positioned near or in contact with the first core, the curved bore pin adapted to form a cooling passage for a bore bridge of the engine component between adjacent cylinders.

In another representation, a method of forming an engine component includes providing a die defining a recess and at least one core; positioning a curved bore pin into the recess on the die, the curved bore pin having an end configured to be positioned near or in contact with the at least one core; and die casting the component with the die and the curved bore pin to form a fluid jacket with a casting skin about the bore pin for a fluid passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder; and
at least one cooling passage positioned within the bore bridge, the at least one cooling passage including an inlet fluidly coupled to the coolant jacket and an outlet positioned at a deck face of the cylinder block, the inlet having a first cross-sectional area that is larger than a second cross-sectional area of the outlet, wherein at least a portion of the at least one cooling passage has a non-cylindrical geometry formed by a lost core, wherein the outlet has a circular cross-sectional shape and the inlet has a non-circular cross-sectional shape, and wherein the outlet forms an opening at the deck face that extends in a first plane and the inlet forms an opening at the coolant jacket that extends in a second plane, perpendicular to the first plane.

2. The system of claim 1, wherein the inlet is arranged perpendicular to the outlet and the at least one cooling passage includes a bend configured to alter a direction of coolant flow within the at least one cooling passage.

3. The system of claim 1, wherein the portion of the at least one cooling passage with the non-cylindrical geometry has a greater depth than width, the depth defined along a cylinder axis of the cylinder block and the width perpendicular to the depth.

4. The system of claim 3, wherein the width of the at least one cooling passage varies along a length of the at least one cooling passage.

5. The system of claim 3, wherein the depth of the at least one cooling passage remains uniform along a portion of a length of the at least one cooling passage between the inlet and the outlet.

6. The system of claim 1, wherein the at least one cooling passage is fluidly coupled to the coolant jacket at a first side of the bore bridge but not at a second side of the bore bridge and wherein the at least one cooling passage extends across at least a portion of a length of the bore bridge.

7. The system of claim 1, wherein the lost core is a glass-filled salt core.

8. A system, comprising:
a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder; and a set of cooling passages positioned within the bore bridge, the set of cooling passages including a first cooling passage having a first inlet fluidly coupled to the coolant jacket and a second cooling passage having a second inlet fluidly coupled to the coolant jacket, vertically above the first inlet, each of the first cooling passage and the second cooling passage terminating at a common outlet positioned at a deck face of the cylinder block, the first cooling passage extending from the first inlet to the common outlet in a substantially straight line and the second cooling passage including a first portion extending from the second inlet to an apex of the second cooling passage and a second portion extending from the apex to the common outlet.

9. The system of claim 8, wherein the first portion extends from the second inlet to the apex at a first angle away from the deck face and the second portion extends from the apex to the common outlet at a second angle toward the deck face.

10. The system of claim 9, wherein the first passage extends from the first inlet to the common outlet at a third angle toward the deck face, and wherein the third angle is different than the second angle.

11. The system of claim 8, wherein the first cooling passage and the second cooling passage are maintained fluidly separate from each other from the first inlet and the second inlet to the common outlet and are only fluidly coupled at the common outlet.

12. The system of claim 8, wherein the cylinder block is coupled to a cylinder head via a gasket, and the gasket includes a hole aligned with the common outlet.

13. The system of claim 8, wherein the common outlet has a width that is greater than a combined width of the first cooling passage and the second cooling passage.

14. A system, comprising:
a cylinder block with a first cylinder and a second cylinder adjacent to the first cylinder and a bore bridge positioned between the first cylinder and the second cylinder, the cylinder block further including a coolant jacket at least partially surrounding the first cylinder and the second cylinder; and a set of cooling passages positioned within the bore bridge, the set of cooling passages including a first cooling passage having a first inlet fluidly coupled to the coolant jacket and a second cooling passage having a second inlet fluidly coupled to the coolant jacket, vertically above the first inlet, each of the first cooling passage and the second cooling passage terminating at a common outlet positioned at a deck face of the cylinder block, the first cooling passage extending from the first inlet to the common outlet in a substantially straight line and the second cooling passage including an apex positioned vertically below the second inlet and the common outlet, where an axis bisects the apex and a midpoint of the first cooling passage, and a first vertical distance from the deck face to the midpoint along the axis is at least twice as large as a second vertical distance from the deck face to the apex along the axis.

15. The system of claim 14, wherein the first cooling passage and the second cooling passage are maintained fluidly separate from each other from the first inlet and the second inlet to the common outlet and are only fluidly coupled at the common outlet.

16. The system of claim 14, wherein the deck face extends in a horizontal plane, wherein the first cooling passage extends to the common outlet at a first outlet angle relative to the horizontal plane, and wherein the second cooling passage extends to the common outlet at a second outlet angle relative to the horizontal plane, the second outlet angle shallower than the first outlet angle.

17. The system of claim 14, wherein the cylinder block is coupled to a cylinder head via a gasket, and the gasket includes a hole aligned with the common outlet.

18. The system of claim 14, wherein the common outlet has a width that is greater than a combined width of the first cooling passage and the second cooling passage.

19. The system of claim 14, wherein the common outlet is separated from the coolant jacket by the bore bridge with a separation width that is between 1-10% of a length of the bore bridge along the deck face.

* * * * *